US011525552B2

(12) United States Patent
Jalbout et al.

(10) Patent No.: US 11,525,552 B2
(45) Date of Patent: Dec. 13, 2022

(54) METHOD FOR TRANSMITTING CONTROL INSTRUCTIONS TO A PLURALITY OF RECEIVERS AND RECEIVER ADAPTED TO RECEIVE A LIGHT PIXEL CARRYING THE CONTROL INSTRUCTIONS

(71) Applicant: SACO Technologies Inc., Montreal (CA)

(72) Inventors: Bassam Jalbout, Mont-Royal (CA); Brian Wong, Kirkland (CA)

( * ) Notice: Subject to any disclaimer, the term of this patent is extended or adjusted under 35 U.S.C. 154(b) by 0 days.

(21) Appl. No.: 17/471,897

(22) Filed: Sep. 10, 2021

(65) Prior Publication Data

US 2022/0076597 A1 Mar. 10, 2022

Related U.S. Application Data

(60) Provisional application No. 63/076,784, filed on Sep. 10, 2020.

(51) Int. Cl.
*G09G 3/00* (2006.01)
*F21V 5/04* (2006.01)
(Continued)

(52) U.S. Cl.
CPC ............... *F21V 5/045* (2013.01); *F21V 5/04* (2013.01); *F21V 13/04* (2013.01); *F21V 14/00* (2013.01); *F21V 19/0015* (2013.01); *F21V 19/02* (2013.01); *F21V 23/004* (2013.01); *G02B 5/003* (2013.01); *G02B 19/009* (2013.01); *G02B 19/0028* (2013.01); *G02B 27/0927* (2013.01);
(Continued)

(58) Field of Classification Search
CPC . F21V 5/045; F21V 5/04; F21V 13/04; F21V 14/00; F21V 19/0015; F21V 19/02; F21V 23/004; G02B 5/003; G02B 19/0028; G02B 19/009; G02B 27/0927; G02B 27/0955; G02B 27/0977; G09G 3/001; G09G 3/32; G09G 2330/02; G09G 2354/00; H04B 10/50; H04B 10/502; H04B 10/1141; F21Y 2105/10; F21Y 2115/10
See application file for complete search history.

(56) References Cited

U.S. PATENT DOCUMENTS

| 7,564,426 B2 * | 7/2009 | Poor ..................... G06F 1/1626 362/800 |
| 8,628,198 B2 | 1/2014 | Jalbout et al. |
| 2010/0264313 A1 * | 10/2010 | Jalbout ............... H05B 47/195 250/340 |

FOREIGN PATENT DOCUMENTS

WO    WO-2005036211 A2 *  4/2005  ......... G02B 19/0014

* cited by examiner

*Primary Examiner* — Stephen G Sherman
(74) *Attorney, Agent, or Firm* — BCF LLP

(57) ABSTRACT

Control instructions are transmitted to receivers by modulating light sources to generate light beams that are modulated with digital data streams for inducing control instructions in the light beams. Each light beam is applied to a pixel shaper element of a pixel shaper assembly to produce a light pixel, each light pixel carrying the control instructions of the light beam, each light pixel having a perimeter defined by the pixel shaper element. The pixel shaper assembly combines the light pixels into an image without significant overlap or voids between the light pixels. The light pixels are directed toward a projector lens for transmission toward the receivers. In a receiver, an optical receiver detects a light pixel. A controller decodes the control instructions received in the detected light pixel and uses the control instructions to control a function of the receiver.

18 Claims, 19 Drawing Sheets

(51) Int. Cl.
  *H04B 10/50*   (2013.01)
  *F21V 23/00*   (2015.01)
  *F21V 13/04*   (2006.01)
  *F21V 14/00*   (2018.01)
  *F21V 19/00*   (2006.01)
  *F21V 19/02*   (2006.01)
  *G02B 5/00*    (2006.01)
  *G02B 27/09*   (2006.01)
  *G02B 19/00*   (2006.01)
  *G09G 3/32*    (2016.01)
  *F21Y 115/10*  (2016.01)
  *H04B 10/114*  (2013.01)
  *F21Y 105/10*  (2016.01)

(52) U.S. Cl.
  CPC ..... *G02B 27/0955* (2013.01); *G02B 27/0977* (2013.01); *G09G 3/001* (2013.01); *G09G 3/32* (2013.01); *H04B 10/50* (2013.01); *H04B 10/502* (2013.01); *F21Y 2105/10* (2016.08); *F21Y 2115/10* (2016.08); *G09G 2330/02* (2013.01); *G09G 2354/00* (2013.01); *H04B 10/1141* (2013.01)

METHOD FOR TRANSMITTING CONTROL
INSTRUCTIONS TO A PLURALITY OF
RECEIVERS AND RECEIVER ADAPTED TO
RECEIVE A LIGHT PIXEL CARRYING THE
CONTROL INSTRUCTIONS

CROSS-REFERENCE

The present application claims priority from U.S. Provisional Patent Application Ser. No. 63/076,784, filed on Sep. 10, 2020, the disclosure of which is incorporated by reference herein it its entirely.

FIELD

The present technology relates to lighting control technologies. In particular, various methods for transmitting control instructions to a plurality of receivers, and receivers adapted to receive light pixels carrying the control instructions, are disclosed.

BACKGROUND

An innovative device projecting a two-dimensional (2D) pixel matrix, in which each "pixel" of the 2D matrix consists of an infrared (IR) digital data stream, is described in U.S. Pat. No. 8,628,198, the disclosure of which is incorporated by reference herein. Since the 2D pixel matrix is projected upon, for example, members of an audience in a stadium, it is possible to transmit different data to different locations in the stadium, so the data received in a particular location can be made specific to a pixel projected to that location. Since each IR digital data stream may be location dependent, various IR digital data streams can be programmed to be unique in content, so that each pixel may be given, if desired, unique instructions, particular to that pixel or stadium location. Receivers of this IR digital data stream, being worn by members of the audience, are thus provided with unique instructions, commands, or data, which may be made dependent upon which pixel, or physical location, they occupy. A movement of a receiver from one pixel location to another automatically changes that receiver's data stream to that transmitted to the new location. The IR digital data stream, if programmed to illuminate the receiver according to color and intensity information, can turn the receivers into a real time, moving light show. The technology described in U.S. Pat. No. 8,628,198 is thus capable of transforming the audience into a 2D video screen.

Even though the recent developments identified above may provide benefits, improvements are still desirable. In particular, empty spaces, or voids, may be present between the various pixels projected on the audience, potentially leaving some of the members of the audience unable to receive the IR digital data stream. Manufacturing costs of the technology may also be a cause for concern. Also, the potential of the technology may not have been fully exploited for other applications.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise the presence of voids between the various pixels, manufacturing costs related to the prior technology, and/or lack of use of the full potential of the prior technology.

In a first aspect, various implementations of the present technology provide a combination, comprising:
   at least one lens; and
   at least one prism;
   the at least one lens and the at least one prism being in an optical path of a corresponding at least one light source, the combination being configured to direct light radiating from the at least one light source toward a projector lens.

In some implementations of the present technology, the at least one light source comprises an array of light sources; and the combination is configured to direct light radiating from the array of light sources toward the projector lens.

In some implementations of the present technology, the at least one lens is a Fresnel lens and the at least one prism is a Fresnel prism.

In some implementations of the present technology, the at least one lens has a positive focus.

In some implementations of the present technology, the combination shapes the light radiating from the at least one light source as a cone-shaped light radiation pattern directed toward the projector lens.

In some implementations of the present technology, the combination is positioned at a given distance from the at least one light source; and a focusing distance of the at least one lens is determined at least in part according to the given distance.

In some implementations of the present technology, an orientation of the at least one prism is determined at least in part to correct a bending angle of the light radiating from the at least one light source.

In some implementations of the present technology, the at least one lens and the at least one prism are formed as a single piece.

In some implementations of the present technology, the projector lens is selected from a fixed lens, a parfocal lens and a varifocal lens.

In some implementations of the present technology, the light radiating from the at least one light source forms an image pixel.

In some implementations of the present technology, the image pixel contains infrared light carrying a digital data stream.

In some implementations of the present technology, the at least one lens comprises a plurality of lenses; the at least one prism comprises a plurality of prisms; and the combination comprises a plurality of pixel forming sub-combinations, each pixel forming sub-combination comprising one of the plurality of lenses and a corresponding one of the plurality of prisms, each pixel forming sub-combination being configured to direct light radiating from a corresponding set of one or more light sources toward the projector lens.

In some implementations of the present technology, at least some of the plurality of pixel forming sub-combinations are formed into a single optical sheet.

In some implementations of the present technology, the single optical sheet is a plastic sheet.

In some implementations of the present technology, the plurality of lenses and the plurality of prisms are on a same side of the single optical sheet.

In some implementations of the present technology, the plurality of lenses is on a first side of the single optical sheet and the plurality of prisms on is a second side of the single optical sheet, the second side being opposite from the first side.

In some implementations of the present technology, each of the plurality of pixel forming sub-combinations has specific optical properties determined at least in part according to a specific distance and a specific angle between the corresponding set of one or more light sources and the projector lens.

In some implementations of the present technology, a focusing distance of a given pixel forming sub-combination is determined at least in part according to a distance between the given pixel forming sub-combination and the corresponding set of one or more light sources.

In some implementations of the present technology, the sets of one or more light sources corresponding to the plurality of pixel forming sub-combinations are distributed over a first two-dimensional area on a mounting support; the plurality of pixel forming sub-combinations is distributed over a second two-dimensional area of the combination; and the specific optical properties of a given pixel forming sub-combination are determined at least in part according to a distance, an angle and an angle of rotation between the given pixel forming sub-combination and the corresponding set of one or more light sources.

In some implementations of the present technology, a first angle of deflection of a first pixel forming sub-combination located on an external edge of the second-two dimensional area is greater than a second angle of deflection of a second pixel forming sub-combination located closer to a center of the second two-dimensional area of the combination.

In some implementations of the present technology, the plurality of sub-combinations is distributed over a two-dimensional (2D) array.

In some implementations of the present technology, the 2D array forms a rectangular matrix.

In some implementations of the present technology, the light radiating from each corresponding set of one or more light sources forms an image pixel.

In some implementations of the present technology, each image pixel contains infrared light carrying a corresponding digital data stream.

In a second aspect, various implementations of the present technology provide a device, comprising:
an enclosure having:
a rear opening adapted to receive a light beam from a light source,
a front opening adapted to emit a modified light beam, and
internal walls extending between the rear opening and the front opening;
the light beam being modified according to a perimeter of the front opening.

In some implementations of the present technology, the perimeter of the front opening forms a rectangle.

In some implementations of the present technology, an internal perimeter of the enclosure is rectangular.

In some implementations of the present technology, the front opening of the enclosure is a plane of focus for the device.

In some implementations of the present technology, the device further comprises a reflective material covering the internal walls of the enclosure.

In some implementations of the present technology, the internal walls of the enclosure are made of a reflective material.

In some implementations of the present technology, the enclosure further comprises a rear reflector plate, the rear opening being formed as a cut-out in the rear reflector plate, a face of the rear reflector plate on the inside of the enclosure being covered with a reflective material.

In some implementations of the present technology, the enclosure further comprises a rear reflector plate, the rear opening being formed as a cut-out in the rear reflector plate, the rear reflector plate being made of a reflective material.

In some implementations of the present technology, a size of the cut-out in the rear reflector plate is selected to allow most of the light beam from the light source to enter the enclosure.

In some implementations of the present technology, the reflective material is a textured reflective material.

In some implementations of the present technology, the rear opening is centrally positioned in an internal perimeter of the enclosure.

In some implementations of the present technology, the device further comprises a Fresnel lens positioned in front of the enclosure so to receive the modified light beam from the front opening of the enclosure, a plane of focus of the device being located in front of the Fresnel lens.

In some implementations of the present technology, the device is adapted to be positioned at a distance from the light source so to leave an air gap between the light source and the device.

In some implementations of the present technology, the device further comprises at least one shade formed of a light absorbing material, the at least one shade being adapted to attenuate light emitted from the device outside of a main direction of the modified light beam.

In some implementations of the present technology, the light beam from the light source is an infrared light beam carrying a digital data stream; and the device is configured to maintain integrity of the digital data stream in the modified light beam.

In a third aspect, various implementations of the present technology provide a combination, comprising:
the above described device and the light source;
a printed circuit board for mounting the light source; and
a reflective material covering a surface of the printed circuit board surrounding the light source.

In a fourth aspect, various implementations of the present technology provide a light shaping assembly, comprising a two-dimensional (2D) array formed of a plurality of devices as defined above, each one of the plurality of devices being adapted to receive a light beam from a corresponding light source.

In some implementations of the present technology, each device of the 2D array is adapted to emit a corresponding light pixel.

In some implementations of the present technology, each light pixel carries a respective digital data stream.

In some implementations of the present technology, the light shaping assembly further comprises a light absorbing hood positioned in front of the plurality of devices and surrounding a 2D array formed by the modified light beams emitted by the plurality of devices, the light absorbing hood being adapted to attenuate light emitted from the light shaping assembly outside of a main direction of the modified light beams.

In some implementations of the present technology, the 2D array forms a rectangular matrix.

In some implementations of the present technology, the light shaping assembly further comprises a Fresnel lens positioned in front of the front openings of the devices of the 2D array.

In a fifth aspect, various implementations of the present technology provide a method for transmitting control instructions to a plurality of receivers, the method comprising:
- modulating a plurality of light sources to generate a plurality of corresponding light beams, each light source being modulated with a corresponding digital data stream for inducing corresponding control instructions in the corresponding light beam;
- applying each of the plurality of light beams to a corresponding pixel shaper element of a pixel shaper assembly to produce a plurality of light pixels, each light pixel carrying the control instructions of the corresponding light beam, each light pixel having a perimeter defined by the corresponding pixel shaper element, the pixel shaper assembly combining the plurality of light pixels into an image without significant overlap and without significant voids between the light pixels; and
- the plurality of light pixels being directed toward a projector lens, the projector lens transmitting the plurality of light pixels toward the plurality of receivers.

In some implementations of the present technology, the light sources form a first two-dimensional (2D) array; the plurality of light beams form a second 2D array; and the plurality of image pixels form a third 2D array.

In some implementations of the present technology, each of the first, second and third 2D arrays forms a respective rectangular matrix.

In some implementations of the present technology, each light source is an infrared light source.

In some implementations of the present technology, the method further comprises replacing each of the plurality of infrared light sources with a temporary light source operable to emit visible light; causing the temporary light sources to emit a plurality of visible light pixels to allow previewing a visible image formed combining the plurality of visible light pixels; and after the previewing the visible image, restoring the plurality of infrared light sources.

In some implementations of the present technology, each light source is operable to emit visible light and infrared light, the method further comprising causing the plurality of light sources to emit a plurality of visible light pixels to allow previewing a visible image formed combining the plurality of visible light pixels.

In some implementations of the present technology, each light source is a light emitting diode (LED).

In some implementations of the present technology, each light pixel is directed toward one or more receivers.

In some implementations of the present technology, at least one of the one or more receivers is a movable receiver adapted to move between reception areas of distinct light pixels.

In some implementations of the present technology, at the least one of the one or more receivers is operable to interpret positional information received in the distinct light pixels.

In some implementations of the present technology, at least one of the one or more receivers includes a user operable switch configured to allow selection of one of a plurality of supported functions.

In some implementations of the present technology, the control instructions transmitted in each light pixel are configured to control, in each of the one or more receivers, a function selected from operating a lighting element, operating a sound element, operating a Bluetooth communication unit, operating a WiFi communication unit, and a combination thereof.

In a sixth aspect, various implementations of the present technology provide a receiver adapted to receive a light pixel carrying control instructions transmitted using the above-described method, the receiver comprising:
- a power source;
- an optical receiver receiving power from the power source and being adapted to detect the light pixel; and
- a controller receiving power from the power source and being operatively connected to the optical receiver, the controller being configured to:
  - decode the control instructions received in the detected light pixel, and
  - use the control instructions to control a function of the receiver selected from operating a lighting element, operating a sound element, operating a Bluetooth communication unit, operating a WiFi communication unit, and a combination thereof.

In some implementations of the present technology, the power source comprises a battery.

In some implementations of the present technology, the sound element comprises a speaker.

In some implementations of the present technology, the sound element comprises an electrical jack output.

In some implementations of the present technology, the receiver is fitted with one or more attachments to allow attaching the receiver to a body part or to a piece of clothing of a wearer.

In some implementations of the present technology, the controller comprises a processor and a non-transitory storage medium containing instructions that, when executed by the processor, allow the controller to interpret and use the control instructions.

In some implementations of the present technology, the receiver further comprises at least one user controllable switch or button allowing a user to select one of a range of functions related to the control instructions.

In a seventh aspect, various implementations of the present technology provide a light shaping assembly, comprising:
- a printed circuit board (PCB); and
- a two-dimensional (2D) array formed of a plurality of rows, each row comprising a plurality of light sources mounted on the PCB, each light source comprising a pair of supporting pins for mounting the light source on the PCB;
- the supporting pins of each light source being bent at an angle increasing as a function of a distance between each light source and a selected point on the PCB so that light beams emitted by the light sources are collectively directed toward a common target.

In some implementations of the present technology, the selected point on the PCB is a center of the PCB.

In some implementations of the present technology, the common target is a projector lens.

In some implementations of the present technology, the light sources are light emitting diodes (LED).

In some implementations of the present technology, each LED is in a T-1¾ package.

In some implementations of the present technology, each light source is held above a top surface of the PCB by its pair of supporting pins.

In some implementations of the present technology, the supporting pins are solder leads; and the light sources are soldered on the PCB.

In some implementations of the present technology, a number of rows of the 2D array is equal to a number of light sources in each row.

In some implementations of the present technology, a number of rows of the 2D array is not equal to a number of light sources in each row.

In some implementations of the present technology, each light beam has a respective beam width; an intensity of each light beam is at its maximum at a center of the respective beam width; and the supporting pins of each light sources are bent so that the center of each respective beam width is directed toward the common target.

In some implementations of the present technology, the 2D array forms a rectangular matrix.

In some implementations of the present technology, each light source is adapted to emit a corresponding light pixel.

In some implementations of the present technology, each respective light source is connectable to a source of a respective digital data stream; and each respective light pixel emitted by the respective light source carries the respective digital data stream.

In an eight aspect, various implementations of the present technology provide a light shaping assembly, comprising:
  a printed circuit board (PCB);
  a two-dimensional (2D) array formed of a plurality of rows, each row comprising a plurality of light sources mounted on the PCB; and
  a Fresnel lens adapted to redirect a light beam emitted by each light source at an angle increasing as a function of a distance between each light source and a selected point on the PCB so that the light beams emitted by the light sources are collectively directed toward a common target.

In some implementations of the present technology, the selected point on the PCB is a center of the PCB.

In some implementations of the present technology, the common target is a projector lens.

In some implementations of the present technology, the light sources are light emitting diodes (LED).

In some implementations of the present technology, each LED is in a T-1¾ package; and each LED is mounted straight up on the PCB.

In some implementations of the present technology, each LED is a surface mount LED.

In some implementations of the present technology, a number of rows of the 2D array is equal to a number of light sources in each row.

In some implementations of the present technology, a number of rows of the 2D array is not equal to a number of light sources in each row.

In some implementations of the present technology, each light beam has a respective beam width; an intensity of each light beam is at its maximum at a center of the respective beam width; and the supporting pins of each light sources are bent so that the center of each respective beam width is directed toward the common target.

In some implementations of the present technology, the 2D array forms a rectangular matrix.

In some implementations of the present technology, each light source is adapted to emit a corresponding light pixel.

In some implementations of the present technology, each respective light source is connectable to a source of a respective digital data stream; and each respective light pixel emitted by the respective light source carries the respective digital data stream.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
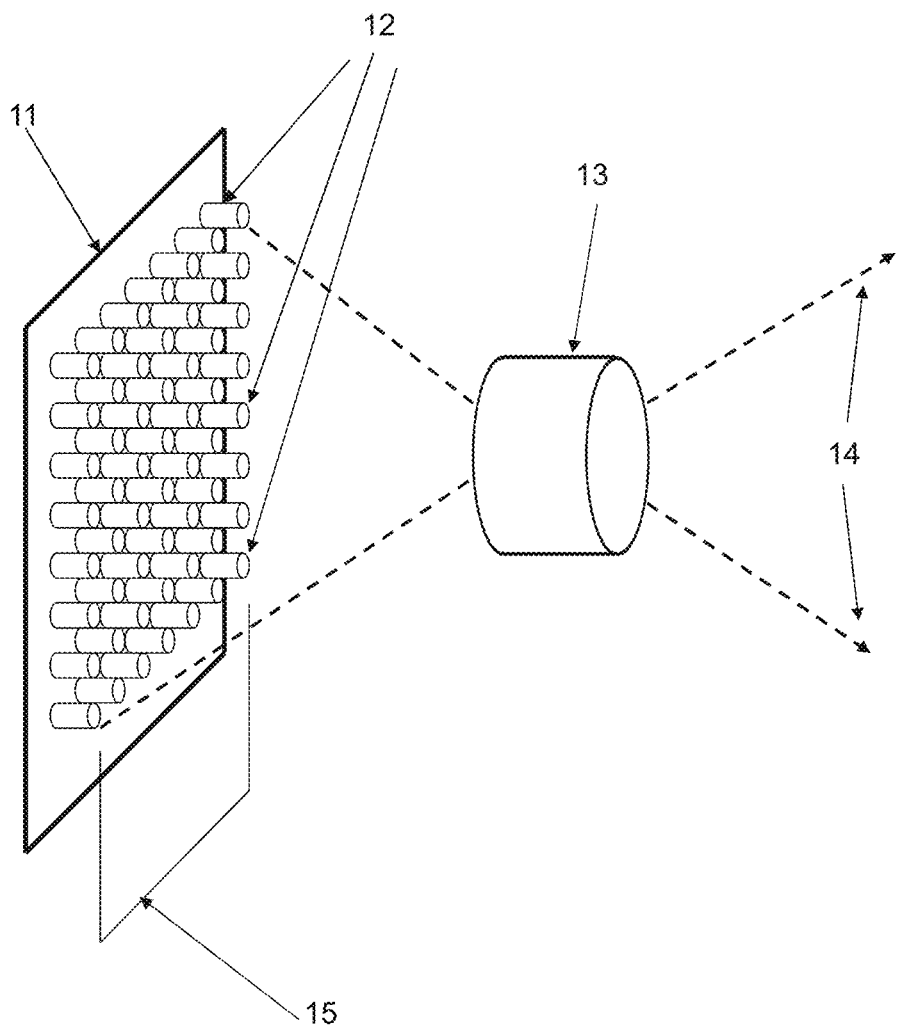
FIG. 1 shows an embodiment of a wireless signal processor with the enhancement of a Zoom lens in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process operations and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect of the present technology, the innovation described in U.S. Pat. No. 8,628,198 is enhanced with new features and capabilities, including for example and without limitation the capability to provide sound, WiFi connections, and Bluetooth connections in a digital data stream contained in a light pixel, or image pixel. The present technology also presents improvements such as a brighter and more efficient use of light emission, comprising for example and without limitation infrared (IR) emission, a production friendly lighting system, and an improved pixel pattern. A two-dimensional (2D) array of pixels, for example and without limitation a rectangular pixel matrix, contains a digital data stream in transmitted image pixel. The 2D array of pixels may have any size from a single pixel to an array of pixels having 'm' rows and 'n' columns, in which values for 'm' and for 'n' have no a priori limitation.

In the context of the present technology, each light pixel or image pixel may be sized according to a conventional definition of the term "pixel". Alternatively, each light pixel or image pixel may cover a broader area of a scene on which it is projected. In a non-limiting example, a size of the light pixels in the 2D array of pixels may be selected so that each pixel will reach a distinct member of the audience. In another non-limiting example, the size of the light pixels in the 2D array of pixels may be selected so that each pixel will reach a small group of members of the audience.

In some embodiments of the present technology, a light pixel may carry a digital data stream and, as a result, the term "pixel" may be interpreted in a manner that departs from its conventional definition.

In another aspect of the present technology, the array of pixels is made both more efficient in brightness, and is more precisely located through a more precise boundary definition for each element of the 2D array of pixels. The optional use of a varifocal or "zoom" (parfocal) type projector lens may provide additional versatility in the deployment of the lighting system. The transmitted data may for example be expanded to contain sound data in addition to the previous multicolor lights. In an embodiment, receivers worn by members of an audience in a target space may be equipped with sound output devices, such as audio speakers and/or earphone jacks, and with volume controls. Optionally, WiFi, Bluetooth, and other supplementary connection technologies may be used to enhance the overall performance capabilities of the lighting system. Several new embodiments of projectors and receivers having improved performance are described herein.

The location and size of each light element, also called image pixel or simply pixel, of the 2D array of pixels may be planned and determined before the actual emission of digital data streams. Consequently, the transmitted data may be used by each receiver to locate its own position within an illumination pattern formed by the 2D array of pixels. As such, the receiver "knows" its position within the 2D array of pixels, thus knowing its physical location as well. The receiver may make use of its precise location data, for navigation, mapping, movement logging, and so forth, in a variety of user software applications. Also, by including a "where are you" flag in the transmitted pixel, the receiver may ping back its location, or use that location data for other uses such as for communication or video games. If the lighting system is deployed upon a playing field, such as in a laser tag studio, any number of new features becomes available to the game programmer.

The transmitted data may also contain sound data, so that each pixel of the 2D array of pixels may carry its own sound channel. In this manner, every pixel in the 2D array of pixels may form a separate sound channel. In a non-limiting example, a 128×256 matrix may be equivalent to a 32,768-channel surround sound system. The surround sound effect of an entire orchestra may thus be formed such that each instrument appears to be located at its correct spatial location. Each member of the audience may thus hear the sound as if they were actual performers in the orchestra.

Some non-limiting examples presented hereinbelow will specifically refer to the use of IR light. IR being invisible, it becomes possible to transmit digital data streams without altering the visual perception of the audience. However, the present technology is not so limited and transmitting digital data streams in pixels containing visible light is also contemplated.

With these fundamentals in place, we will now consider some non-limiting examples to illustrate various implementations of aspects of the present technology.

Figure 2:
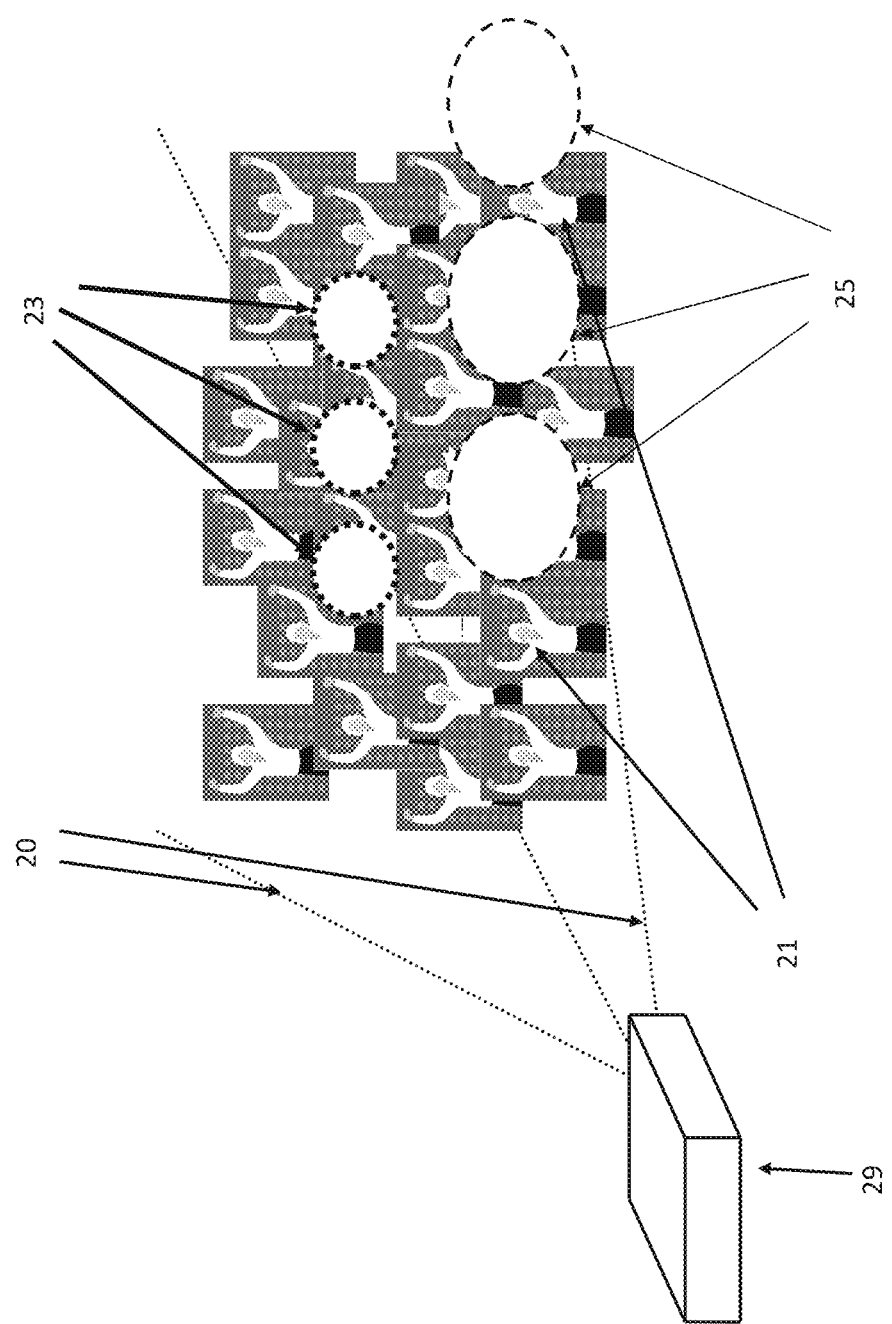
FIG. 2 shows a typical pixel spacing for various zoom lens settings in accordance with an embodiment of the present technology.

FIG. 1 shows an IR light emitting diode (LED) matrix being part of a lighting system. The IR LED matrix is usable to project an image onto an audience. FIG. 2 shows a pulsed IR projected image displayed on an audience of people wearing reactive circuits. FIG. 1 modifies a technique introduced in U.S. Pat. No. 8,628,198, to reflect the new innovations of the present technology. FIG. 1 shows an array of IR LEDs 12, the LEDs 12 being mounted on a flat printed circuit board (PCB) 11. The LEDs 12 project their IR emissions using a projector lens 13, which may be a varifocal length or a "zoom" lens having zoom and focusing capabilities. Use of a conventional lens without zoom capabilities is also contemplated. The use of the projector lens 13 with zoom and focusing capabilities allows the distance of the projector lens 13 to be a fixed distance from a plane of focus 15 of the projector lens 13 at the front of the array of LEDs 12. This allows the projector to have a fixed configuration while adjusting variously sized targets and distances. Thus, a projected image 14, aimed at target receivers, such as members of an audience in stadium stands, as shown on FIG. 2, may be adjusted for size and placement as desired, without modifications to the projector design and construction.

FIG. 2 shows three projected pixels 23, which are pixels 23 of an overall IR image 20 being projected into space. Only three pixels 23 are shown, out of an entire matrix that may contain hundreds of pixels 23, in order to simplify the illustration. The pixels 23 are illustrated showing a typical size (noting that the image is not to scale). By comparing the pixels 23 and other pixels 25, the effect of "zooming" the projector lens can 13 (FIG. 1) change the sizes of the "pixels", from the size of the pixels 23, to the size of the pixels 25, by adjusting the projector lens 13 to a longer "zoomed" focal length. Although FIG. 2 is not to scale, the drawing illustrates typical differences in sizes between the pixels 23 and the pixels 25. This gives an operator of the lighting system a flexibility to select pixel sizes and locations, for example by defining wider or narrower field of coverage than in previous technologies. Members of the audience are wearing receivers 21 that decode the IR data transmission of their particular pixel 23, 25. In an aspect of the present technology, each receiver 21 in the area of a particular pixel 23, 25 may receive a unique data stream, specific to that particular pixel location. Thus each audience member may receive a unique data stream defined by their unique location. Some of the pixel locations may have more than one audience member; alternatively a given location may be empty. The sizes and shapes of the pixels 23, 25 projected upon the stadium stands may be designed and determined by choice of projector lens design and setting, and by the number and spacing of the LEDs 12 within the projector. The larger the number of pixels 23, 25 in the matrix, the larger the coverage area can be for the same pixel spacing. Alternatively or in addition, a large number of pixels 23, 25 may provide a high resolution in the pixel distribution for the same total area of coverage. In an embodiment, a traditional lens without "zoom" capability may be used, if the lens is properly selected for the appropriate size, resolution and distance placement of the projector.

As the lens 13 is "zoomed" or adjusted in focal length, the image size and placement of the pixels 23 changes to reach the size and placement of the pixels 25. Evidently, the light emitted from the projector is IR, which is invisible to humans. Embodiments of the present technology allow an operator or installer of the lighting system to preview the actual placement and size of the pixels.

In one embodiment shown on FIG. 1, the projector may be equipped with an easily swapped PCB 11. The PCB 11 may be temporarily swapped with a PCB emitting visible light, for example red light. In the resultant image being projected upon the audience, the pixels 23 and 25 are visible to the operator or installer, who can then adjust settings of the projector lens 13 and adjust the projector placement for a desired result and effect. Since the pixels 23 and 25 may have empty spaces between them, a method of obtaining coverage in these in-between areas is to slightly de-focus the projector lens 13, resulting in the pixels 23, 25 forming blurred circles that overlap each other. By swapping a LED PCB 11 with a visible light LED PCB, or by enabling the visible light on a multi color LED, the expected IR illumination may be previewed by the operator or installer. Although there may be a slight focus shift in lenses, between IR and red light, due to optical properties, these effects are usually less than 1% of the focal length. Optionally, the manufacturer of the projector lens 13 may mark this slight focusing change on a focusing ring of the projector lens 13. The operator or installer may configure the lighting system with the red light in view of obtained the desired effects. Otherwise stated, the operator or installer may configure the projector by using the visible red light, then install the PCB 11 with the LEDs 12 that emit IR light, then adjusting the focus as specified by the manufacturer of the projector lens 13. When a chromatically corrected true zoom lens is used, the effective focal length and other adjustments are not affected by focusing shift between red and IR light. Consequently, the focusing distance is also unchanged when changing the focal length of a chromatically corrected true zoom lens.

In another embodiment, multicolor LEDs 12, being for example adapted for emitting red and IR light, can be used on the PCB 11. The red color of the LED may be activated for previewing the image and, later, the IR image may be activated when the lighting system is in actual operation.

Figure 3A:
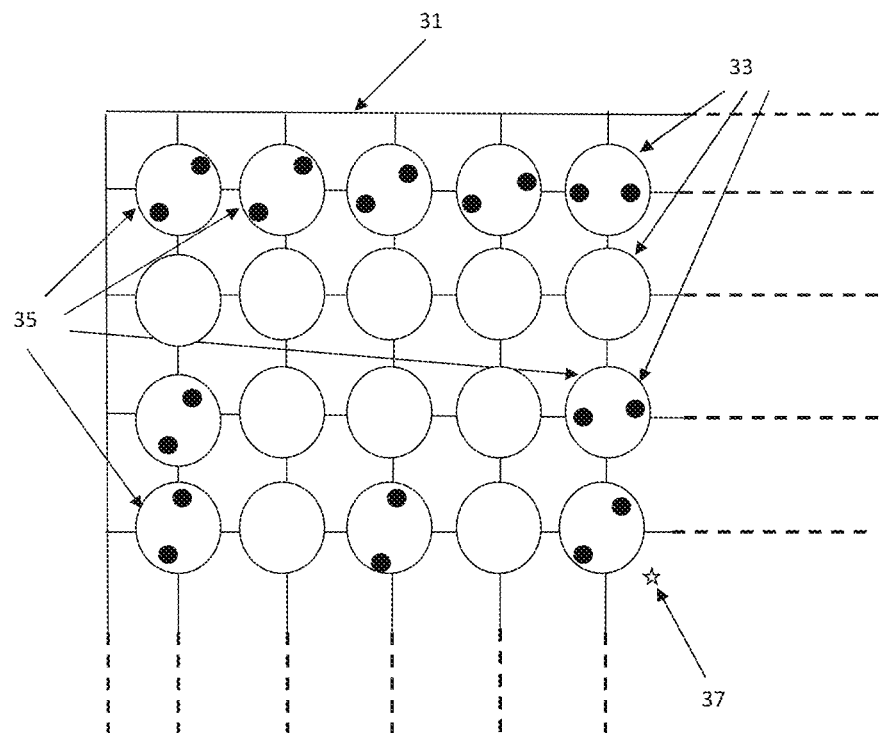
FIG. 3A shows a printed circuit board layout used to improve infrared light efficiency in accordance with an embodiment of the present technology.
Figure 3B:
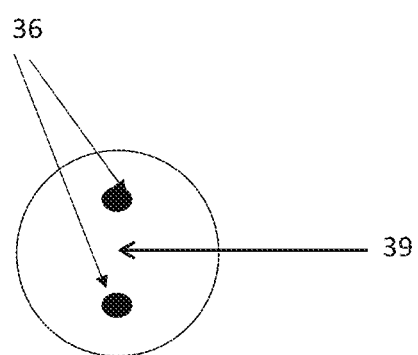
FIG. 3B shows an expanded view of the printed circuit board layout of FIG. 3A in accordance with an embodiment of the present technology.

FIG. 1 illustrates an embodiment in which the projector lens 13 is more or less directly centrally located in view of the PCB 11. Other configurations may be contemplated. To this end, FIG. 3A shows a layout of pin insertions on PCBs when LEDs with solder leads are used to orient light beams emitted by the LEDs. FIG. 3B shows an expanded view of the PCB layout of FIG. 3A. On FIG. 3A, a PCB 31 is populated by a matrix 33 of 2-pin LEDs 35, the center of the PCB 31 being indicated by a marker 37. In a non-limiting embodiment, the matrix 33 is a rectangular matrix. It may be noted that this marker 37 may not actually appear on the PCB 31, as it is used herein only to denote the center position on the PCB 11 for illustration purposes. The matrix 33 of FIG. 3A is an 8×10 matrix for illustration purposes. In a particular embodiment, the matrix 33 may be much larger than this, being for example a 128 by 256 matrix. FIG. 3A therefore only has a small number of individual LEDs 35, whereas in the 128 by 256 example, 32,768 LEDs 35 would correspond to 32,768 individual pixels.

Figure 4:
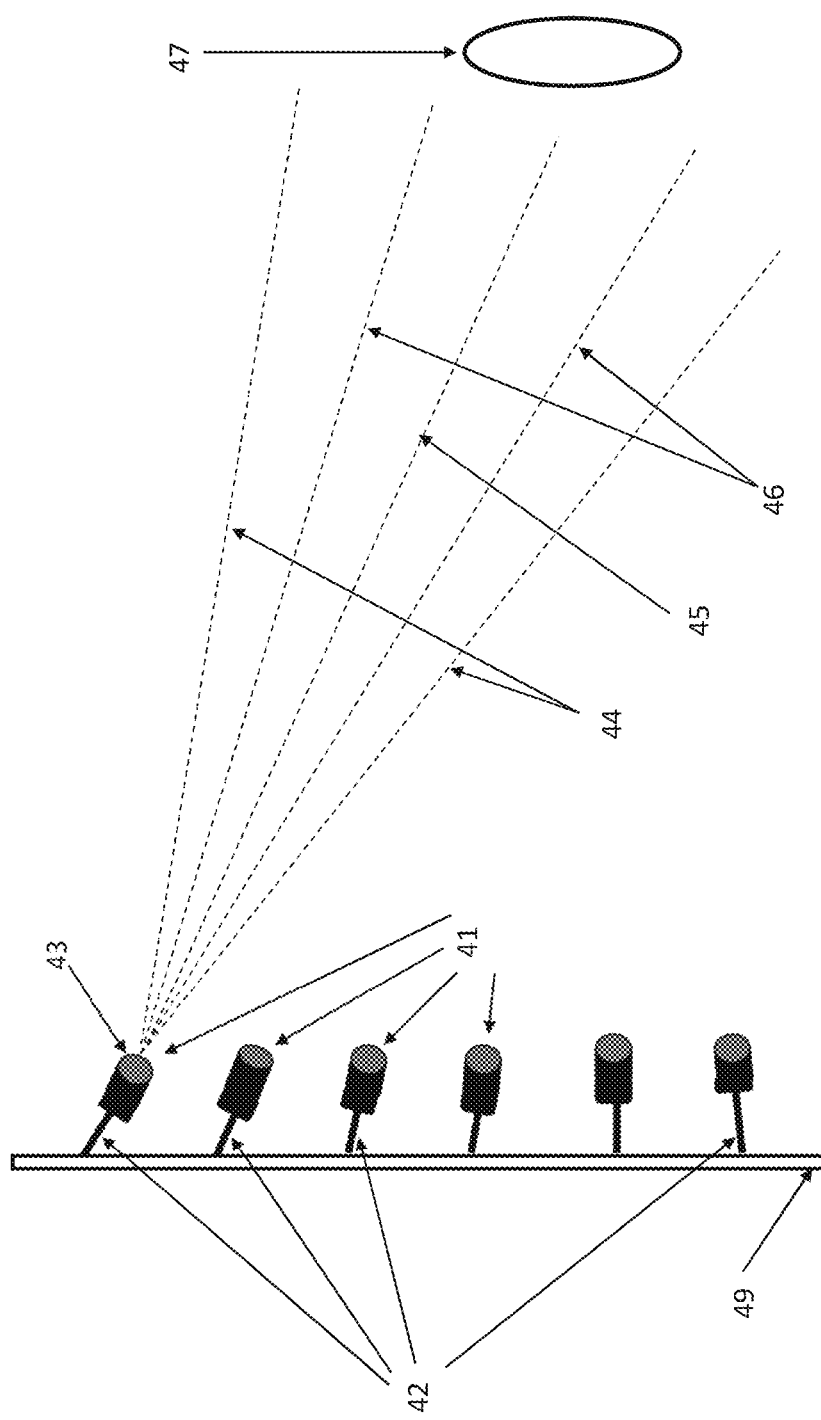
FIG. 4 shows an infrared LED orientation for improved infrared light efficiency in accordance with an embodiment of the present technology.

In a non-limiting embodiment, the LEDs 35 may be supplied in the form of a lead packaging, for example T-1¾ packages 41 or a similar package. In that format, each LED 35 includes two pins (also called wire leads). FIG. 4 illustrates LED pins 42 being bent to angles to allow light beams emitted by the LEDs 35 a projector lens 47. The T-1¾ LED packages 41 have small lenses 43 at the top of the LEDs 35. The two pins 42 of the T 1¾ packages 41 may easily be bent in an axis 39 (FIG. 3B) of the PCB 31, perpendicular to a pair of leads 36 (FIG. 3B). A PCB 49 is assembled with the LED packages 41, which are raised up and not flush to the PCB 49, in order that the pins 42 can be bent. Bending the pins 42 of the LED packages 41 towards the center of the projector lens 47 allows the maximum illumination of the projector lens 47, by any particular LED 35, as this places a central beam 45 of the LED 35 to fall upon the center of the projector lens 47. It may be observed that the further the distance of a given LED package 41 from a center line of the PCB 49, the greater the bended angle of the pins 42, as seen by comparing the various row of LEDs packages 41 on FIG. 4. Since the LEDs packages 41 are bent towards a center line, directly pointing towards the projector lens 47, the contacts on the PCB 49 are configured to be at 90 degrees from the bending direction. FIG. 3A shows the PCB 31, with the matrix 33 of LEDs 35, the contacts for the 2-pin LEDs 35.

LEDs packages 41 that are equidistant from the center 37 form a circle having a particular radius and their leads 36 are bent at substantially equal angles, with respective orientations allowing their central light beams 45 to reach the center of the projector lens 47.

Hence, by providing a bend or tilt of the pins 42, the center of the LED beam's emission is directed at the center of the projector lens 47, where the center of the LED beam is the maximum intensity of the beam spread. This provides the maximum transmission of LED illumination to the target, for this embodiment of the PCB. LED beams have a fairly narrow beam, down to +/−15 degrees (arrows 44) from center (arrow 45), +/−7.5 degrees (arrows 46) from center (arrow 45). However, as can be seen on FIG. 4, a significant portion of the light beams from the LEDs 35 fail to reach projector lens 47. This leads to a significant loss of lighting efficiency. Also, installers of the lighting system may find cumbersome to bend the pins 42 of the T-1¾ LED packages.

Figure 5:
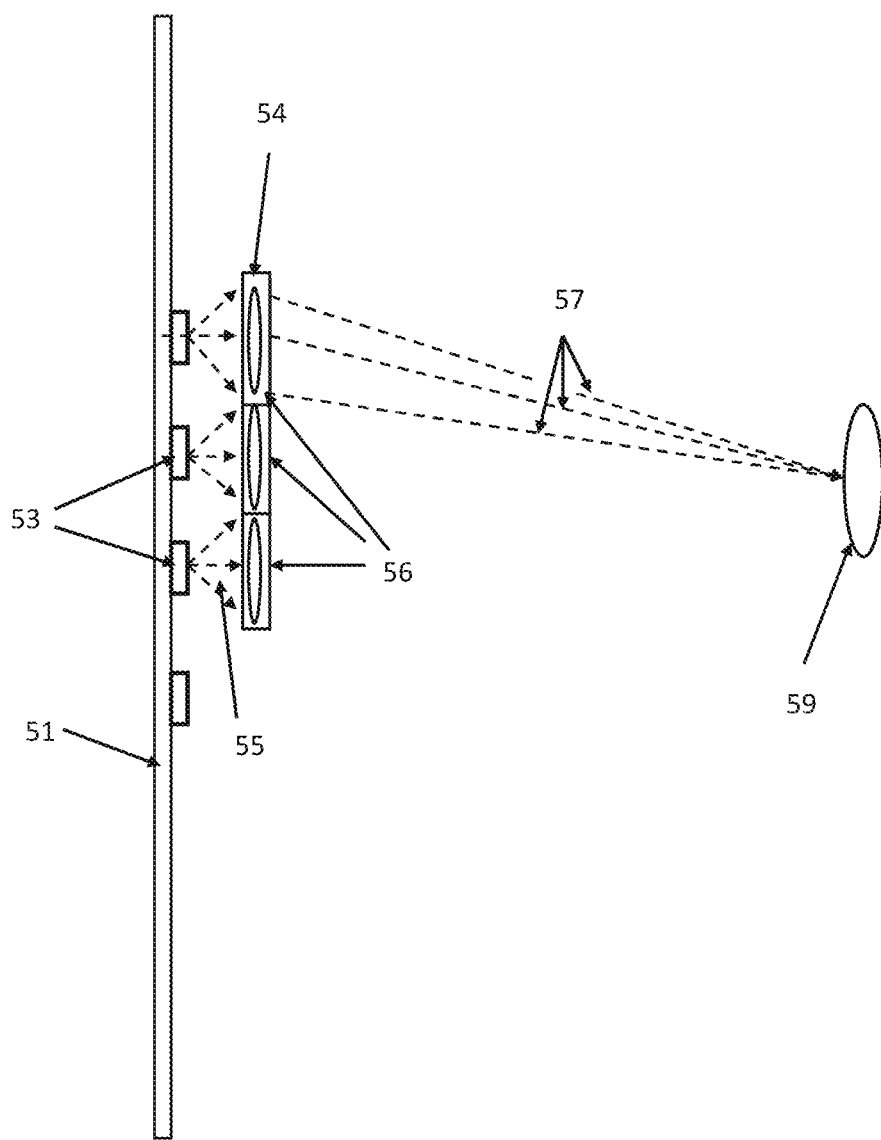
FIG. 5 shows the use of a lens/prism combination to increase infrared light efficiency for surface mounted LEDs in accordance with an embodiment of the present technology.

In another embodiment, FIG. 5 shows a LED spread captured and directed to a lens. This embodiment uses surface mount LEDs 53, which are mounted on the surface of a PCB 51. The surface mount LEDs 53 have a wider beam spread 55 when compared to the LEDs packages 41. The surface mount LED packages cannot be "bent" towards a projector lens 59, as were the T-1¾ packaging of FIG. 4. Therefore, an optical plastic or glass cover forming an optical sheet 54 is provided in order to efficiently capture most of the light energy radiated by each surface mounted LED 53. In an embodiment of the present technology, an optical Fresnel lens and prism combination 56 includes a positive focus (+ diopters) lens and a prism, to both focus and redirect the light radiation 57 towards the projector lens 59. It may be noted that each one of the surface mount LEDs 53 may have a corresponding area of the plastic/glass capture sheet so that each surface mounted LED 53 may have a corresponding capture area in the Fresnel lens and prism combinations 56. Each of the Fresnel lens and prism combinations 56 may have specific optical properties due to the specific distance and angle of each surface mount LED 53 relative to the projector lens 59. In a non-limiting embodiment, the Fresnel lens and prism combinations 56 may be constructed in the form of a sheet, for example a plastic sheet or a sheet made of a similar optical material, using an automated process similar to processes used in lens crafting for eyeglasses. Alternatively, the Fresnel lens and prism combinations 56 may be constructed using numeric controlled machining or 3D printing.

Figure 6:
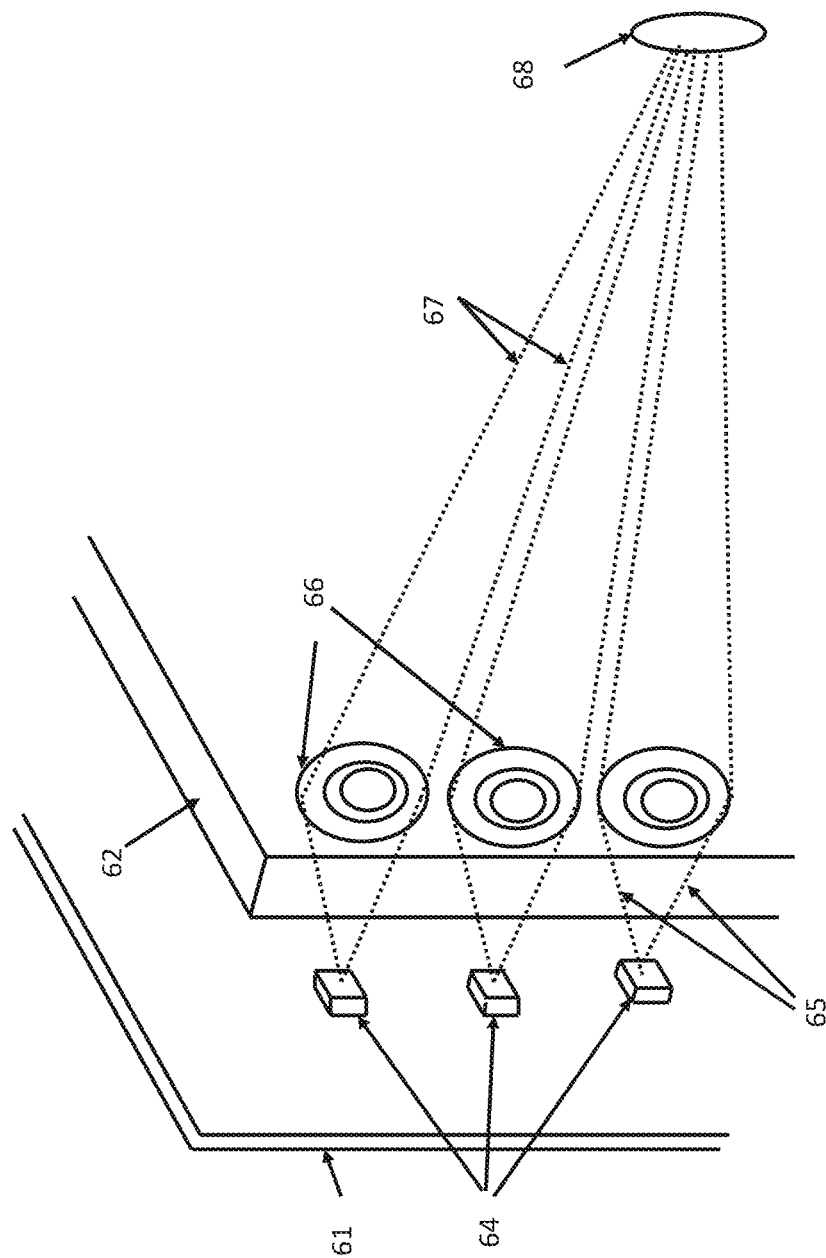
FIG. 6 shows useful properties of the lens/prism combination in accordance with an embodiment of the present technology.

FIG. 6 shows how optical lenses concentrate light from LEDs toward a projector lens. FIG. 6 illustrates optical properties of individual shaped optical lenses 66, which altogether form an optical sheet 62. The optical sheet 62 may for example be constructed as a lens board made of plastic. Surface mounted LEDs 64, mounted on a PCB 61, radiate their energy in a cone shaped light radiation pattern 65, toward the shaped optical lenses 66, shown on FIG. 6 and, similarly, on FIG. 5. The optical properties of the shaped optical lenses 66 allow to focus as much as possible of the light radiation pattern 65 onto the projector lens 68, as shown with arrows 67 on FIG. 6. It may be noted that there is a spacing between the PCB 61, and the optical sheet 62. This spacing allows adjusting the proper focusing distance for the shaped optical lenses 66 while also providing an air space for cooling the surface mounted LEDs 64. Of course, since each surface mounted LED 64 is at a different distance and angle from the projector lens 68, each of the shaped optical lenses 66, may be designed to provide a unique focusing distance and a corresponding prism orientation to provide the correct bending angle of the light.

Figure 7:
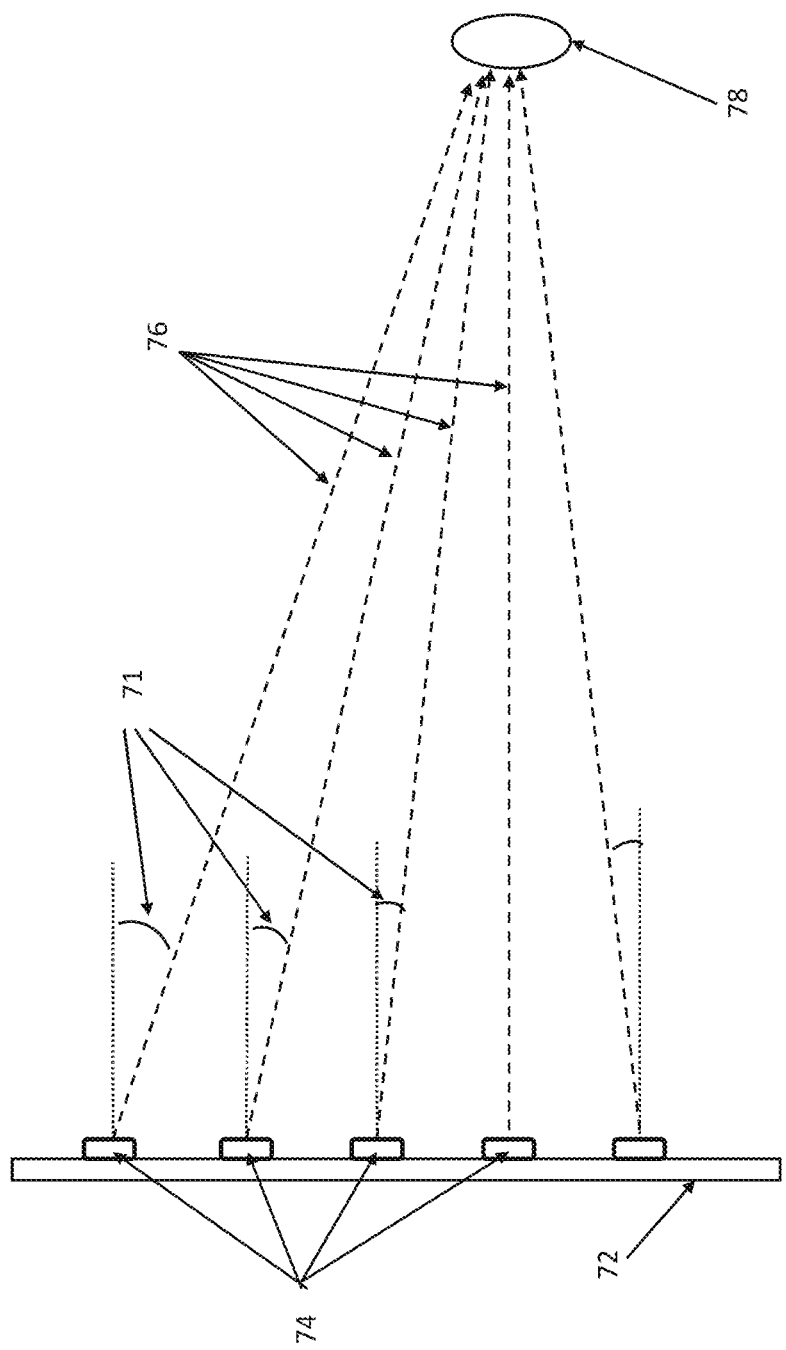
FIG. 7 shows a geometry of the light infrared beams relative to the projector lens in accordance with an embodiment of the present technology.

FIG. 7 illustrates various angles and distances for each of a plurality of LEDs. As can be seen on FIG. 7, the LEDs 74 on the PCB 72 radiate their light beams directly forward, i.e. perpendicularly from the PCB 72. A lens is provided in front of each LED 74 in order to focus their light beams into a spot converging on a projector lens 78. A resulting angle of deflection 71 may be different for each location, the angle being also rotated at a different horizontal and vertical axes relative to the PCB 72. Three parameters are thus accommodated for each LED 74, including a distance from the projector lens 78, a deflection angle 71, and a rotation of the deflection angle. The LEDs 74 that are closer to corners of the PCB 72 at larger deflection angles than those closer to the center of the PCB 72. The LEDs 74 with the larger deflection angles are also at longer distances to the projector lens 78. In an embodiment, the lenses mounted on the most distant LEDs 74 may have a longer focusing distance to bring the light beams 76 of those LEDs 74 into focus at the projector lens 78. Since the distance and angle of deflection 71 from the projector lens 78 may differ for each LED 74, each lens may have a different magnification power and a different deflection angle. Depending on the position of a given LED 74, the angle of deflection may be in both axes of the PCB 72, so that the light beam from a LED 74 positioned in a corner of the PCB 72 may be deflected both vertically (up/down) as well as horizontally (left/right) at the same time. For example, the orientation of the deflection may be rotated by 45 degrees when a LED 74 is positioned on a corner of a square PCB.

Figure 8A:
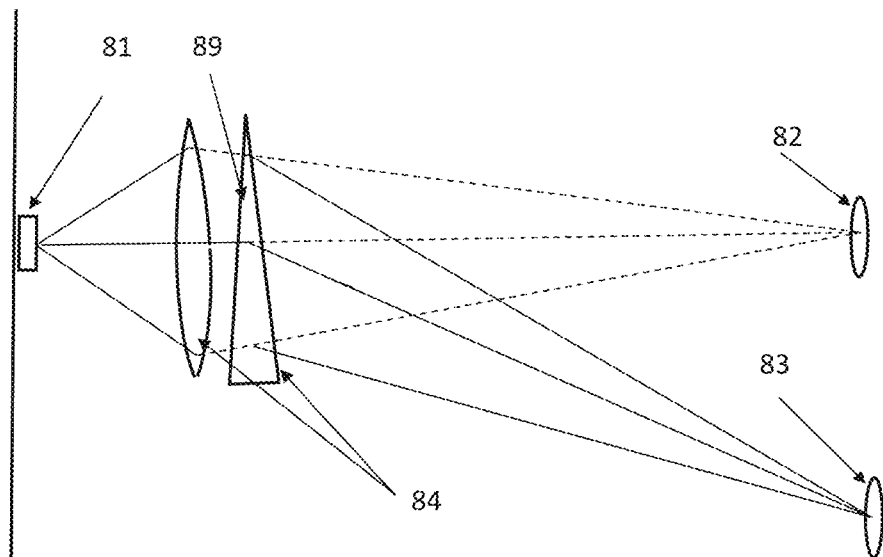
FIGS. 8A and 8B show how the lens/prism combination of FIG. 7 may be simplified for ease of manufacturing in accordance with an embodiment of the present technology.
Figure 8B:
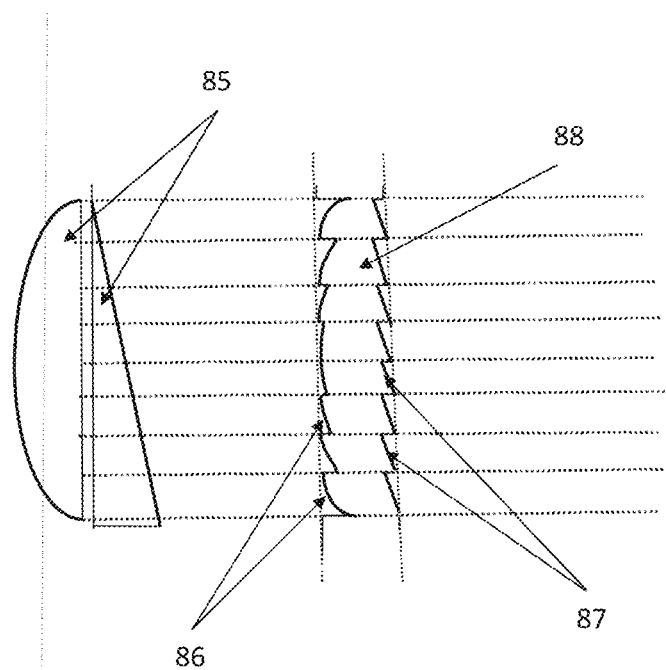

FIGS. 8A and 8B show how the lens/prism combination of FIG. 7 may be simplified for ease of manufacturing. The combinations shown on FIGS. 8A and 8B show how deflection and focusing may be accomplished using Fresnel lenses and a prism.

Considering FIG. 8A, radiation from a LED 81 should ideally be captured by a lens/prism combination 84 that, without any deflection, would come to focus at a projector lens located in an ideal position 82 directly in line with the LED 81. When "in focus", an image of the illuminated junction of the LED 81 is projected onto the surface of the projector lens located in the ideal position 82. This captures the maximum amount of light from the LED 81 and delivers it to the projector lens located in the ideal position 82. However, an angle of deflection is usually implemented because the LED 81 may not directly be in line with a real position 83 of the projector lens. In fact, in a 2D array of LEDs 81, at most one centrally positioned LED 81 could occupy this central sweet spot in front of the ideal position 82 of the projector lens. In practice, for an even number of rows or columns in the 2D matrix, no LED 81 might be located in that sweet spot. Therefore, a prism 89 is included in the lens/prism combination 84. This prism 89 deflects the light beam from the LED 81, in this case downwards, towards the real position 83 of the projector lens, which is in an offset location relative to the ideal position 82 of the projector lens. The light beam is now travelling the hypotenuse of a triangle formed by the prism 89 and the ideal and real positions of the projector lens. A distance from the lens/prism combination 84 to the real position 83 of the projector lens is longer than a distance than from the lens/prism combination 84 to the ideal position 82 of the projector lens. Consequently, the lens/prism combination 84 may be designed to have this longer focusing distance.

It may be noted that the LED 81 may transmit data in the form of pixel carrying a digital data stream within a pixel. The light beam from the LED 81 may actually be an IR light beam that does not carry an image pixel. Therefore, any astigmatic or other optical distortions or loss of resolution that might be caused by the lens/prism combination 84 would have no consequence.

The lens and prism may be combined in a single piece in order to facilitate their installation. On FIG. 8B, the lens/prism combination 84 of FIG. 8A has been optically modified into an equivalent lens/prism combination 85. On FIG. 8B, a front surface of the lens/prism combination 85 may be formed to be twice as strong as each single side of the lens/prism combination 84 of FIG. 8A, to compensate for the flat side (flat having zero optical strength) of the lens in the lens/prism combination 85. Also, the prism 89 of the lens/prism combination 84 has been replaced by the prism in the lens/prism combination 85, which has a steeper angle on the rear of the prism, to compensate for the first surface angle on the prism of the lens/prism combination 84. In an embodiment, the lens/prism combination 85 may thus have the same basic resultant strength as the design of the lens/prism combination 84.

The lens prism/combination 85 may introduce some added distortion to the light beam, due to its more radical optical angles. Regardless, as previously stated, these distortions do not affect the transmission of the digital data stream. It may also be noted that the change from the lens/prism combination 84 into the lens prism combination 85 can be made less radical in shape by using a plastic of higher refractive index (values of over 1.8 are available, whereas normal glass is around 1.3). An optical plastic sheet with the individual lens/prism combination 85 may be used, where each LED 81 may have its own specified lens power, prism power, and prism orientation built into the sheet.

In an embodiment where the LED 81 spacing is close, each lens/prism combination 85 may be made using a reasonably thin optical plastic. With high refractive index plastic, the optical plastic sheet may be produced using standard numerically controlled (NC) machining.

In another embodiment where the spacing between the LEDs 81 of the 2D matrix is larger, a larger diameter of lens/prism 85 may be used. A Fresnel lens 86 and a Fresnel prism 87 may be implemented, at the front and back surfaces of an optical plate 88 respectively, to form the equivalent of a Fresnel lens/prism combination. This Fresnel lens/prism combination may be made part of the optical sheet 62 (FIG. 6) and of the optical sheet 54 (FIG. 5). By using the Fresnel technology, a larger diameter lens/prism may be made while keeping the optical sheet reasonably thin. The angle of the Fresnel prism 87 may rotated at any angle towards the center of a projector lens. The focusing strength of the Fresnel Lens 86 may be designed to compensate for the calculated distance from the LED 81 to the real position 83 of the projector lens (FIG. 8A).

Figure 9A:
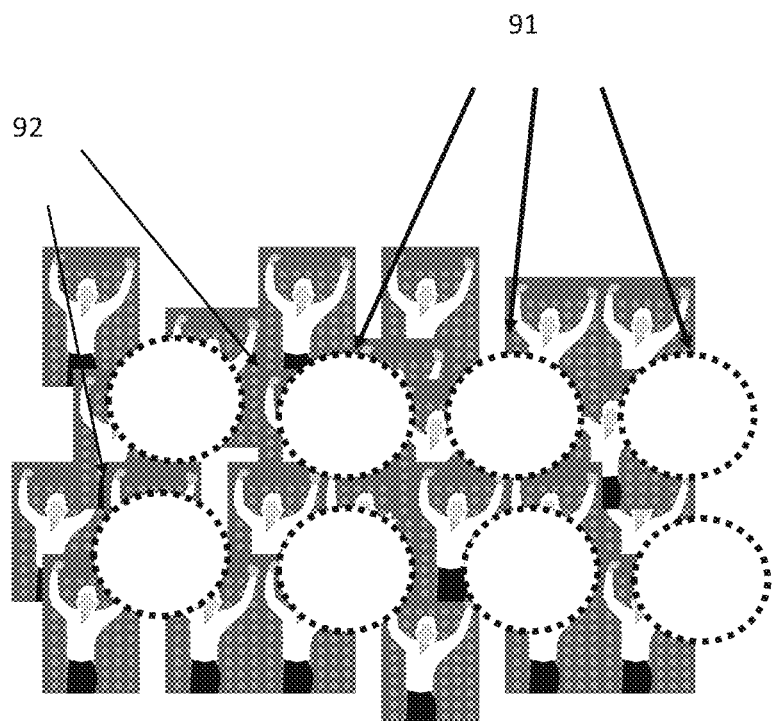
FIG. 9A shows a non-ideal pixel pattern and shape.
Figure 9B:
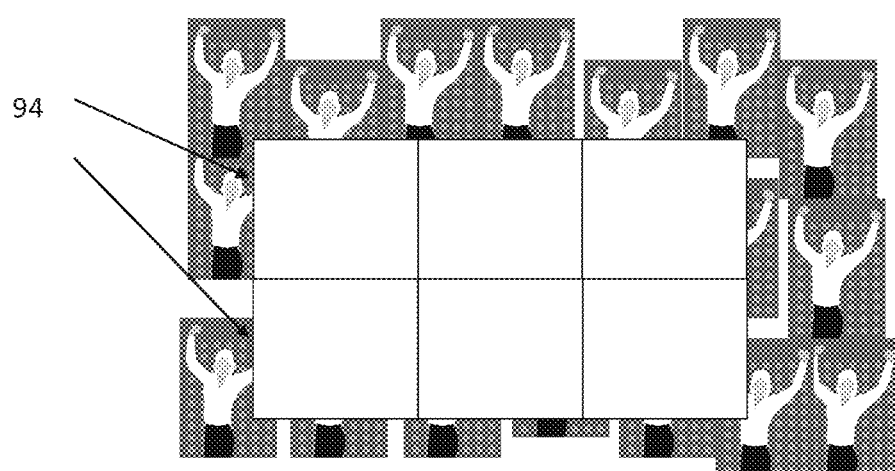
FIG. 9B shows an ideal pixel pattern and shape in accordance with an embodiment of the present technology.

FIGS. 9A and 9B illustrate two different patterns of a pulsed IR image projected onto an audience of people wearing reactive circuits according to another embodiment. FIG. 9A shows a pattern projected upon the audience in the embodiment described on FIG. 2, which shows the pixels 23 and 25. Projected pixels 91, eight of which are shown with typical sizes for illustration purposes, have spaces 92 between them. The IR signal is weaker in the spaces 92 than within the main beam or center of the pixels 91. The IR signal quality depends on the light scattering within the lighting system. De-focusing of the projector lens may have purposely created a blurred image, allowing at least some IR signal reception in the spaces 92. Poor reception in the spaces 92 is not sharply defined. When moving from the coverage of one pixel 91 to another, reception transition is gradual and not sharply defined. As each pixel 91 may carry a different digital data stream, a noisy and ambiguous signal may be detected in the spaces 92.

FIG. 9B shows pixels 94 that are formed according to an ideal pixel pattern. The rectangular shapes fit together from one pixel to the next without noise, scatter, or other poor signal problems. There are no weak reception areas between the pixels 94, and the rectangular shapes fit together tightly between any two adjacent pixels 94. It is contemplated that pixels having triangular, square or hexagonal shapes may also be produced, as it is possible to configure such pixels so that they fit together with no overlap and without leaving any gap therebetween. The examples presented herein, which show rectangular pixels, are for illustration purposes and should not be construed as limiting the generality of the present disclosure.

Figure 10:
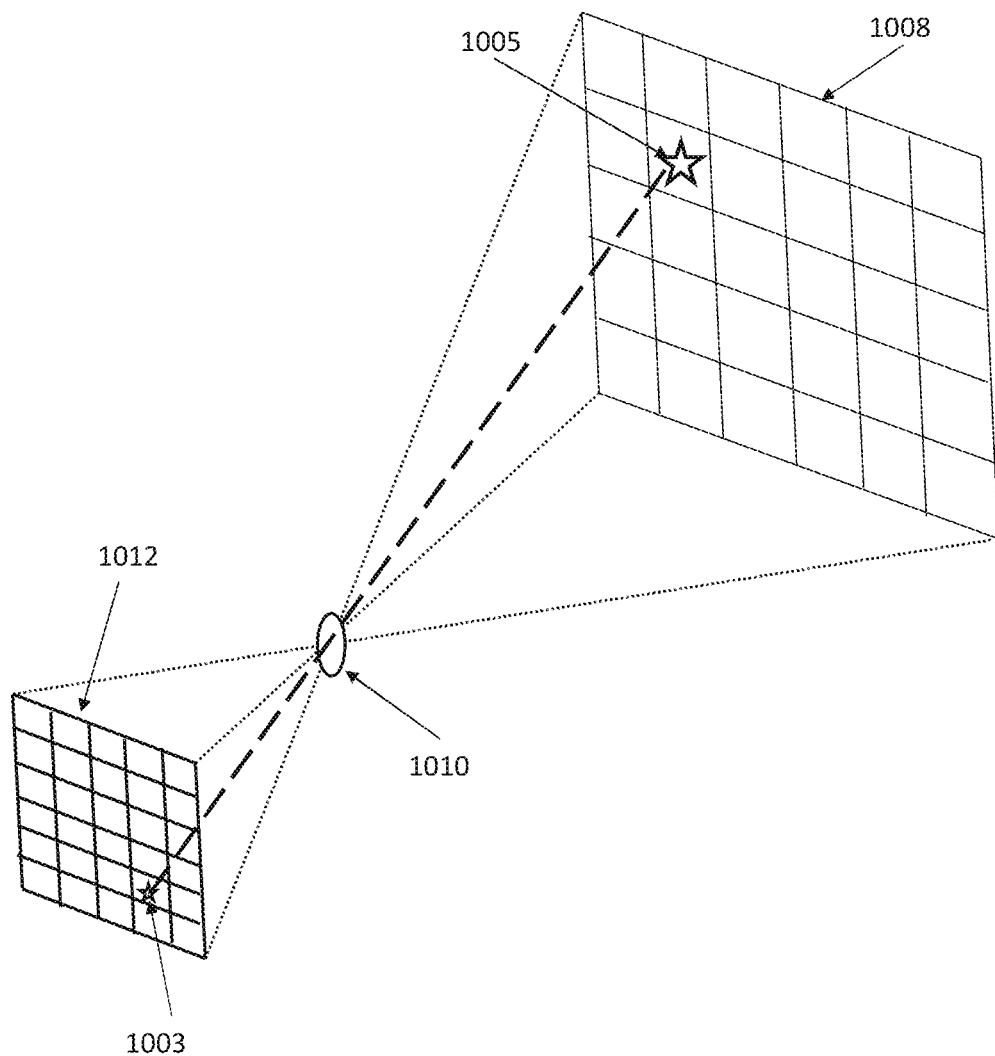
FIG. 10 shows useful shapes to generate the ideal pixel pattern of FIG. 9B in accordance with an embodiment of the present technology.

FIG. 10 illustrates a technique for projection of rectangular pixels. FIG. 10 shows a focusing plane 1012 of a rectangular 2D matrix pattern 1008 being projected upon the audience. The rectangular 2D matrix pattern 1008 is an embodiment of the ideal pattern of the pixels 94 of FIG. 9B. To produce a sharp, well defined image at the level of the audience, the rectangular pattern created at the focusing plane 1012 of a projector lens 1010 is made by adjusting the projector lens 1010 to focus the focusing plane 1012 onto a plane of the rectangular 2D matrix pattern 1008. By creating such a pattern, a typical pixel 1003, rectangular in shape, is projected as a rectangular pixel 1005 at the level of the audience, thus achieving the desired projection pattern of the pixels 94 of FIG. 9B. It may be noted that there is no space between the projected pixels, as the rectangular pixels touch each other flat side to flat side. As a result, there is no area of poor signal reception between the pixels. When a member of the audience moves from a first pixel to a second, adjacent pixel, there is a sharp transition between the digital data stream received in the first pixel and the digital data stream received in the second pixel, with no or very limited ambiguity between the received data streams.

Figure 11:
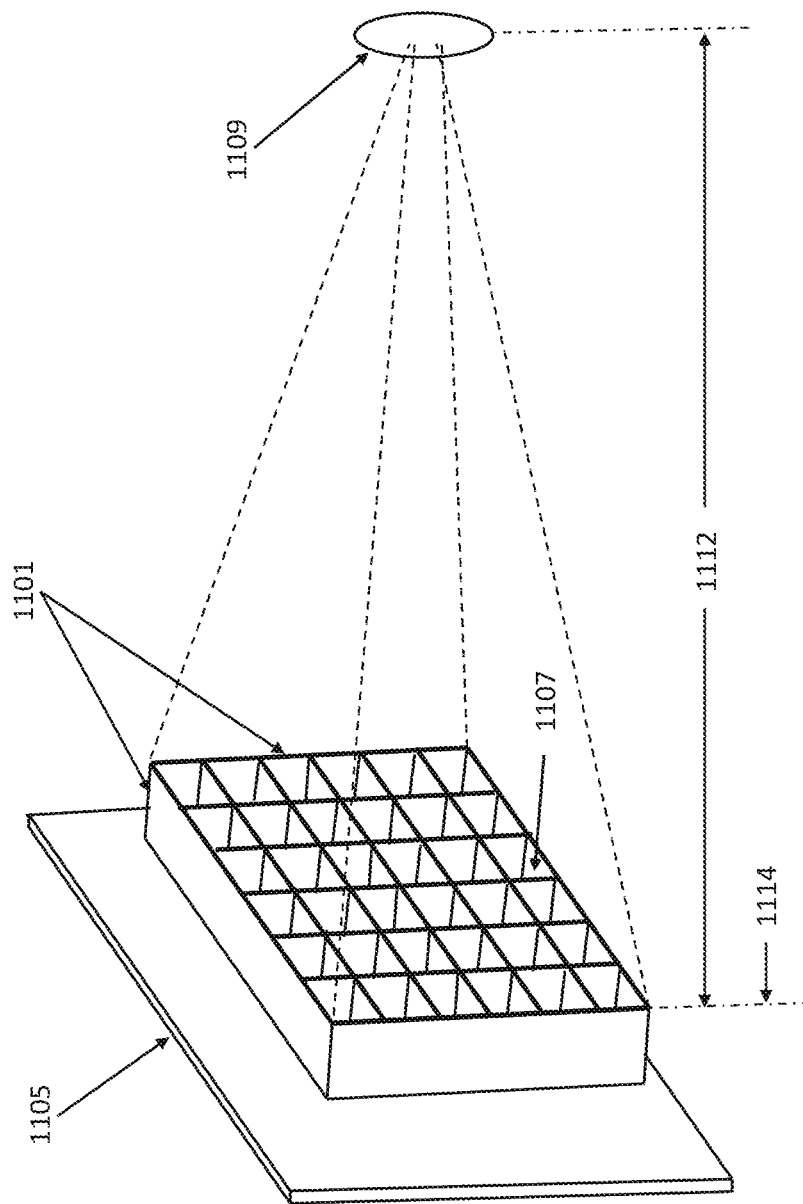
FIG. 11 shows a beam shaper for producing the ideal pixel pattern of FIG. 9B in accordance with an embodiment of the present technology.
Figure 12:
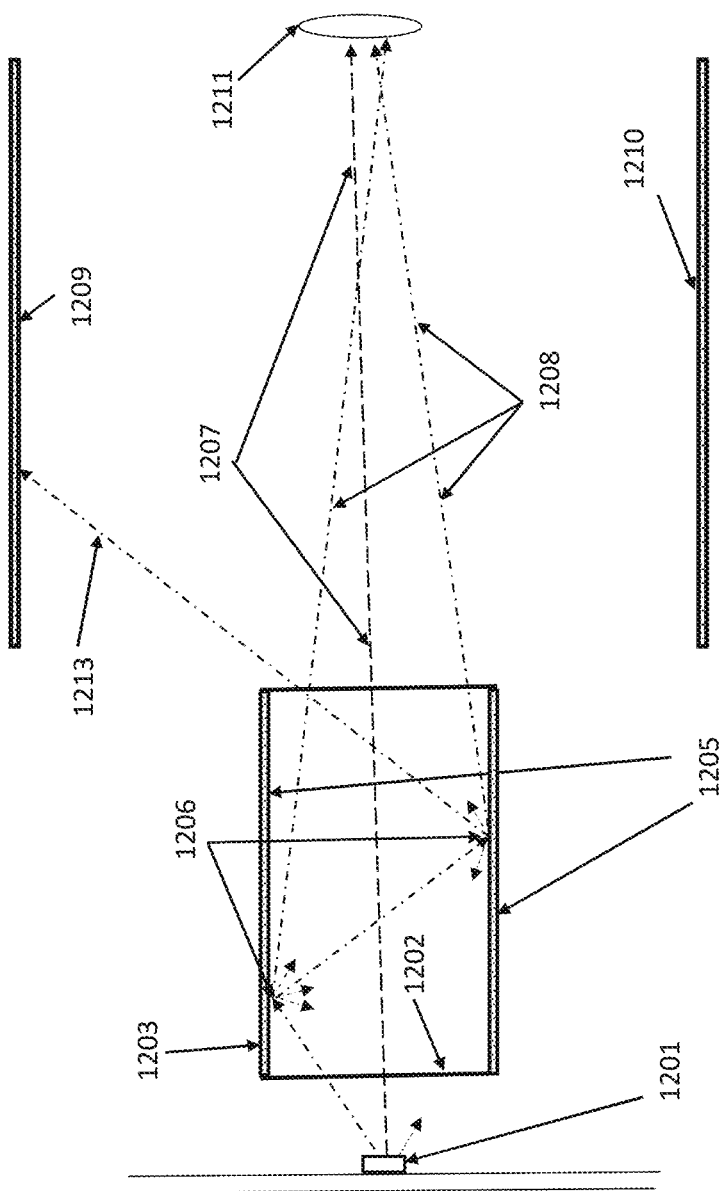
FIG. 12 shows details of a method for full coverage of a pixel area in accordance with an embodiment of the present technology.

FIG. 11 illustrates a pixel shaper assembly. FIG. 12 describes operation details of the pixel shaper assembly of FIG. 11. FIG. 11 shows the method used to shape the rectangular pixels. A pixel shaper assembly 1101, which may for example be formed of a metallic structure, is placed above the LEDs of a transmitting LED PCB 1105. The pixel shaper assembly 1101 shapes the light from each pixel into a rectangular shape. An expanded view of one element of the pixel shaper assembly 1101, is shown on FIG. 12. It may be noted that there is a corresponding shaper piece 1107 dedicated to each individual LED on the PCB 1105, being placed in a central relation thereto. FIG. 11 shows that the pixel shaper assembly 1101 may be made of metallic parts that "point" towards a projector lens 1109. Since the front opening of the pixel shaper assembly 1001 is purposely flat and rectangular, it forms the desired rectangular pixel shape and becomes the plane of focus 1114 to be projected toward the audience. The projector lens 1109 is focused to produce a sharp rectangular image, at a focusing distance 1112, upon the audience, as per the pixels 94 of FIG. 9B.

In alternative embodiments, each individual shaper piece 1107 may have a triangular, square, or hexagonal shape, the pixel shaper assembly 1101 being used to shape the light from each pixel into a corresponding shape.

FIG. 12 details the illumination of one shaper element 1203 of the pixel shaper assembly, which is adapted to shape a single pixel. Each LED 1201 on a PCB has its own corresponding shaper element 1203, which may have a rectangular shape in a non-limiting embodiment. Because the shaper element 1203 is oriented towards a projector lens 1211, and because the shaper element 1203 is rectangular, it forms the desired shape of the projected rectangular pixel, as in the case of the pixels 1003 and 1005 shown on FIG. 10. The rectangle may be viewed by the projector lens 1211 as being "filled" with light in order for each projected pixel to be filled with data coverage, the entirety of the projected image also being filled with data coverage. The inside of the shaper element 1203 is fully illuminated with light, as seen from any angle in the direction towards the projector lens 1211, in order to fill the rectangular pixel with light. The shaper element 1203 may be located anywhere on the 2D matrix of LEDs and may therefore be at various angles from the center line, as expressed in the description of FIG. 4. On FIG. 12, the spread of the light beam from the LED 1201 is shown entering a shaper cage of the shaper element 1203 through a cut-out in a reflector plate 1202. A part of the light beam that is most perpendicular to the LED 1201, shown as a direct light ray 1207, finds its way directly to the projector lens 1211. However, significant parts of the light beam are radiated at various angles. Hence, some light rays 1206 impinge on internal sides of the shaper cage. Internal walls 1205 of the shaper cage are coated with a textured reflective surface, for example a textured metallic surface, that reflects but also spreads most of the light of the light rays 1206. Alternatively, the entire shaper cage may be made of a reflective metallic material. The front surface of the reflector plate 1202, other than the above-mentioned cut-out, is also coated with the reflective surface. Thus, the light rays 1206 bounce around within the shaper cage until resulting rays 1208 find their way out of the front exit of the shaper element 1203 and reach the projector lens 1211. Since the inside of the walls 1205 of the shaper element 1203 and the front of the reflector plate 1202 have reflective textured surfaces, the projector lens 1211 sees the inside of the shaper element 1203 as being fully illuminated. It may be noted that the bouncing of the light within the shaper element 1203 has no significant impact on the digital data stream: for example, the length of the shaper element 1203 may be about 2 centimeters, so 10 reflections would only cause a delay of 20 cm, or less than 0.7 nanoseconds at the speed of light.

From the point of view of the projector lens 1211, the inside surfaces of the shaper element 1203 are fully illuminated by the LED emissions and are fully visible. Thus, the projected image, including the pixels 94 (FIG. 9B) and the rectangular pixels 1005 (FIG. 10), is fully illuminated by the IR light. Because the focus of the projector lens 1109 (FIG.

11) is set to the front edge of the pixel shaper assembly 1101 that forms the plane of focus 1114, sharp rectangular pixels are projected.

Some portion of the light emitted by the shaper elements 1203 may not reach the projector lens 1211. Misdirected light rays 1213 are at a sharper angle and will not reach the projector lens 1211. The light rays 1213 may be absorbed by shades 1209 and 1210, or hoods, made of light absorbing material positive around the pixel shaper assembly 1101. As a result, the misdirected light rays 1213 are prevented from bouncing around the inside of the projector housing and are prevented from causing optical "flare or "noise" in the desired signal, which might otherwise lower the signal to noise (S/N) ratio of the digital data stream.

The efficiency of the pixel shaper assembly 1101 described in relation to FIGS. 11 and 12 may be improved by the use of a "faster" i.e. lower f/stop projector lens.

Figure 13:
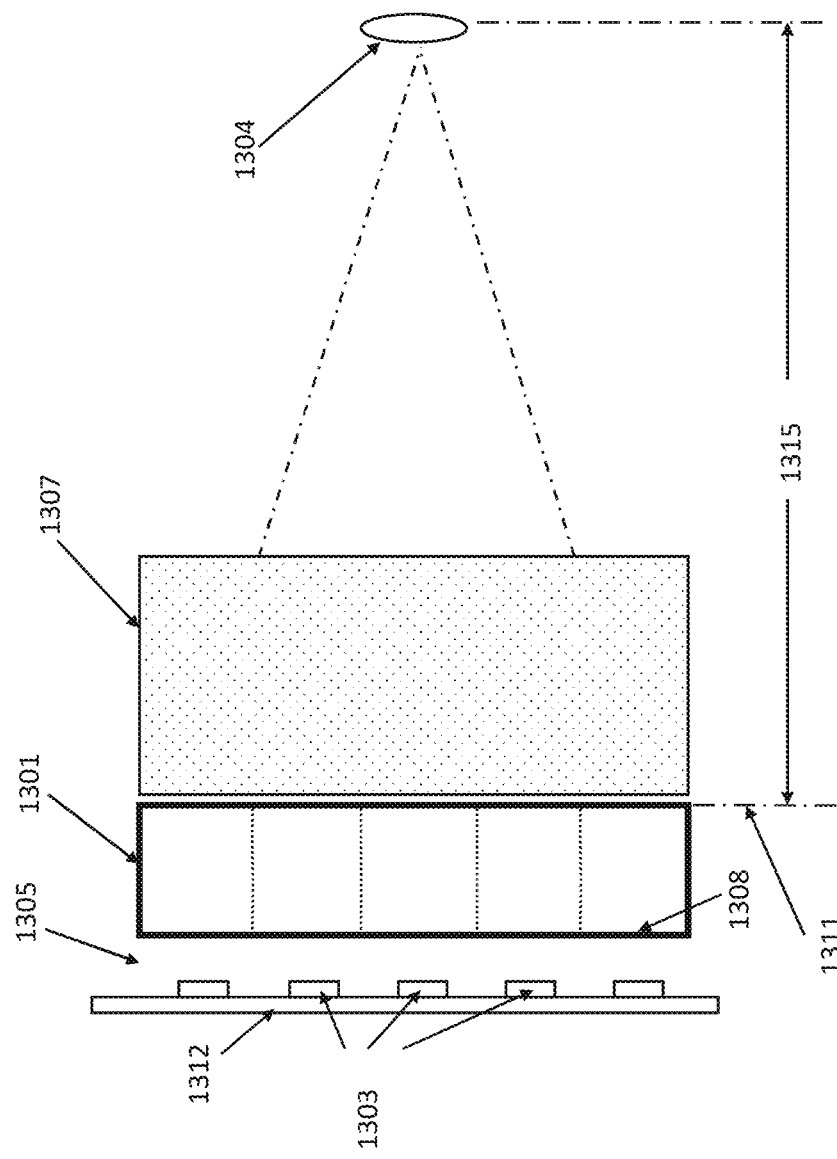
FIG. 13 shows an optical shade installed to reduce optical noise and flare in accordance with an embodiment of the present technology.

FIG. 13 illustrates a light absorbing hood 1307 positioned between a PCB 1312 and a projector lens 1304. On FIG. 13, a reflector plate 1308 and a pixel shaper assembly 1301 are slightly separated from the PCB 1312. This leaves an air gap 1305, for the cooling of LEDs 1303 and other components mounted on the PCB 1312. A plane of focus 1311, in front of the pixel shaper assembly 1301, is at a focusing distance 1315 from the projector lens 1304. Cut-outs (not shown) on the reflector plate 1308 as well as the separation distance of the air gap 1305, are all calculated and shaped to allow nearly all the light to enter the shaper element 1203 (FIG. 12) and the pixel shaper assembly 1301. That is, the beam spread of each LED 1303 is used to determine the size of the cut-out in the reflector plate 1308, for the required air gap 1305, as per the LED manufacturer's specifications regarding the beam spread.

The projector lens 1304 "sees" the inside edges of shaper elements in the pixel shaper assembly 1301, so the projected rectangle is filled to the edges with light radiation. Thus, no significant portion of the projected rectangular pixels is left without coverage. It may be noted that the projector lens 1304 may be focused at the front edge of the pixel shaper assembly 1301, in order to project rectangular pixels with substantially complete and non-overlapping coverage upon the receivers in the audience.

Figure 14:
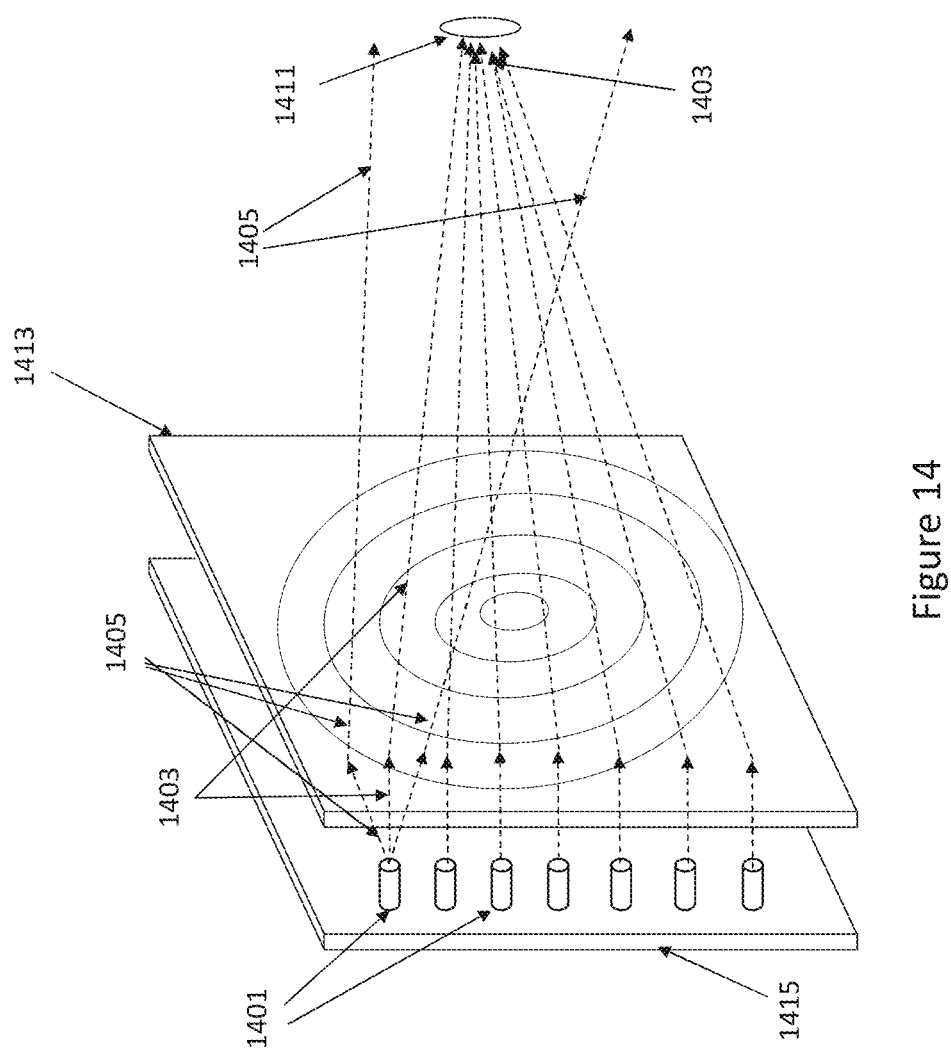
FIG. 14 shows the use of a Fresnel lens to increase infrared intensity in accordance with an embodiment of the present technology.

FIG. 14 illustrates a simple Fresnel lens. FIG. 14 shows a simple method to increase the LED illumination at the projector lens without having to bend the leads of T-1¾ LEDs. The same technique may also be used along with surface mounted LEDs. A large Fresnel lens 1413, which may be made of plastic, is placed in front of LEDs 1401 mounted on a PCB 1415. The focal length of the Fresnel lens 1413 is chosen to be equal to the distance from this Fresnel lens 1413 to a first surface of a projector lens 1411. Some light beams 1403 that are coming straight out from the LEDs 1401 are focused by the Fresnel lens 1413 onto the lens surface of the projector lens 1411. Other light beams that deviate at small angles from this perpendicularity, are redirected by the Fresnel lens 1413 and also reach the projector lens 1411, depending on its diameter. Still other light beams 1405 further out from the center miss the projector lens 1411 and do not contribute to the transmitting digital data streams. The light beams 1405 are lost and may be absorbed by a shade similar to the light absorbing hood 1307 (FIG. 13). The embodiment of FIG. 14 may for example be used where a simple low-cost method of improving performance is desired, when using surface mounted LEDs or when it is desired not to bend the leads of T-1¾ LEDs.

Figure 15:
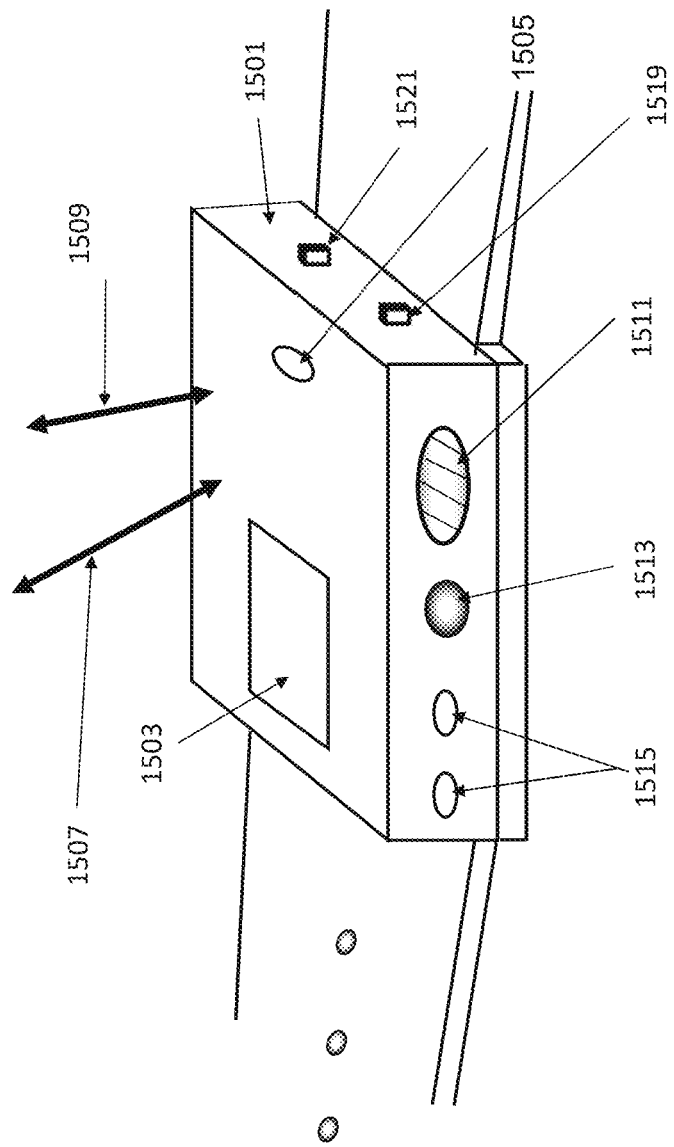
FIG. 15 shows an embodiment of a receiver module with light, sound, and RF wireless capabilities in accordance with an embodiment of the present technology.

FIG. 15 shows a packaging for a typical receiver for the lighting system. A receiver 1501 is packaged for wearing on the wrist of a member of the audience. Other embodiments may include, without limitation, packages adapted to be worn as necklaces, clip-on items, hats, and the like. FIG. 15 shows how the receiver 1501 may be controlled using one or more switches, for example an ON/OFF switch 1519 and a function selection switch 1521. An optical receiver 1505 receives the pixel 1005 (FIG. 10) defining a data "channel" for its location in the rectangular 2D matrix pattern 1008. Each rectangular pixel of the 2D Matrix is effectively a distinct communication download channel specifically for the display location of the pixel. The clearly marked rectangular boundaries of the rectangular 2D matrix pattern 1008 of FIG. 10, and of the pixels 94 of FIG. 9B, allow the pixels or channels to be separated and isolated from the adjacent and other pixels or channels. Thus, there is effectively the same number of distinct channels as there are pixels. For a 128×256-pixel matrix, 32768 distinct channels are thus defined. The actual pixel or channel which is received depends on the physical location of the receiver 1501 within the pixel matrix. In the example of FIG. 10, the channel being communicated is the rectangular pixel 1005 within the rectangular 2D matrix pattern 1008. All other rectangles within the rectangular 2D matrix pattern 1008 have their own unique communication channels, because the LEDs 12 (FIG. 1) that create the digital data streams of the rectangular 2D matrix pattern 1008 are all individually controlled and encoded. The data streamed in the IR digital data signal from the projector lens 1010, may consist of any kind of data. For example, color and intensity data for a LED display 1503, or sound, outputted onto a speaker 1511 or onto an earphone jack 1513, the speaker 1511 and the earphone jack 1513 being operatively connected to volume controls 1515. Also, since each channel or pixel of the pixel matrix is separate and unique, the data could include the actual position of the data. For example, on FIG. 10, a receiver 1501 within the rectangular pixel 1005 would receive "002,002", meaning that the user is in the second row, second column of the 2D matrix pattern 1008. Other messages and data may be sent simultaneously, allowing a large variety of video games which would take advantage of this feature. This is especially true since the receiver 1501 may be provided with both WiFi capabilities 1507 and Bluetooth capabilities 1509. The digital data stream being received over an optical signal, it may have extremely high data rates.

The present technology provides the speaker 1511 with an immensely complex surround sound capability. While, for example, Dolby 6 defines 6 channels, a 128×256-pixel matrix may support 32768 channels; larger matrices may actually be defined. An entire symphonic orchestra may be reproduced, instrument by instrument, using this surround sound feature.

There is no limitation to the forms of sound and light effects that may be carried out. Moving from one pixel area to another means the wearer of the receiver 1501 may automatically start receiving the data for the newly occupied pixel. Since each receiver 1501 is aware of its location within the pixel matrix, all manners of games and video games, such as extensive laser tag type games, may be created using this feature.

The receiver 1501 may log in real time its movements within the pixel matrix in an internal memory. Other uses of the present technology may be contemplated, for example by covering the floor of a trade show with a pixel matrix to allow visitors to be tracked, data mine their interests, and provide audio information to the visitors as they move from one exhibit to another. The WiFi and Bluetooth capabilities of the receiver 1501 may enable all manners of applications, for example localized interactions for visitors in an exhibit hall.

Figure 16:
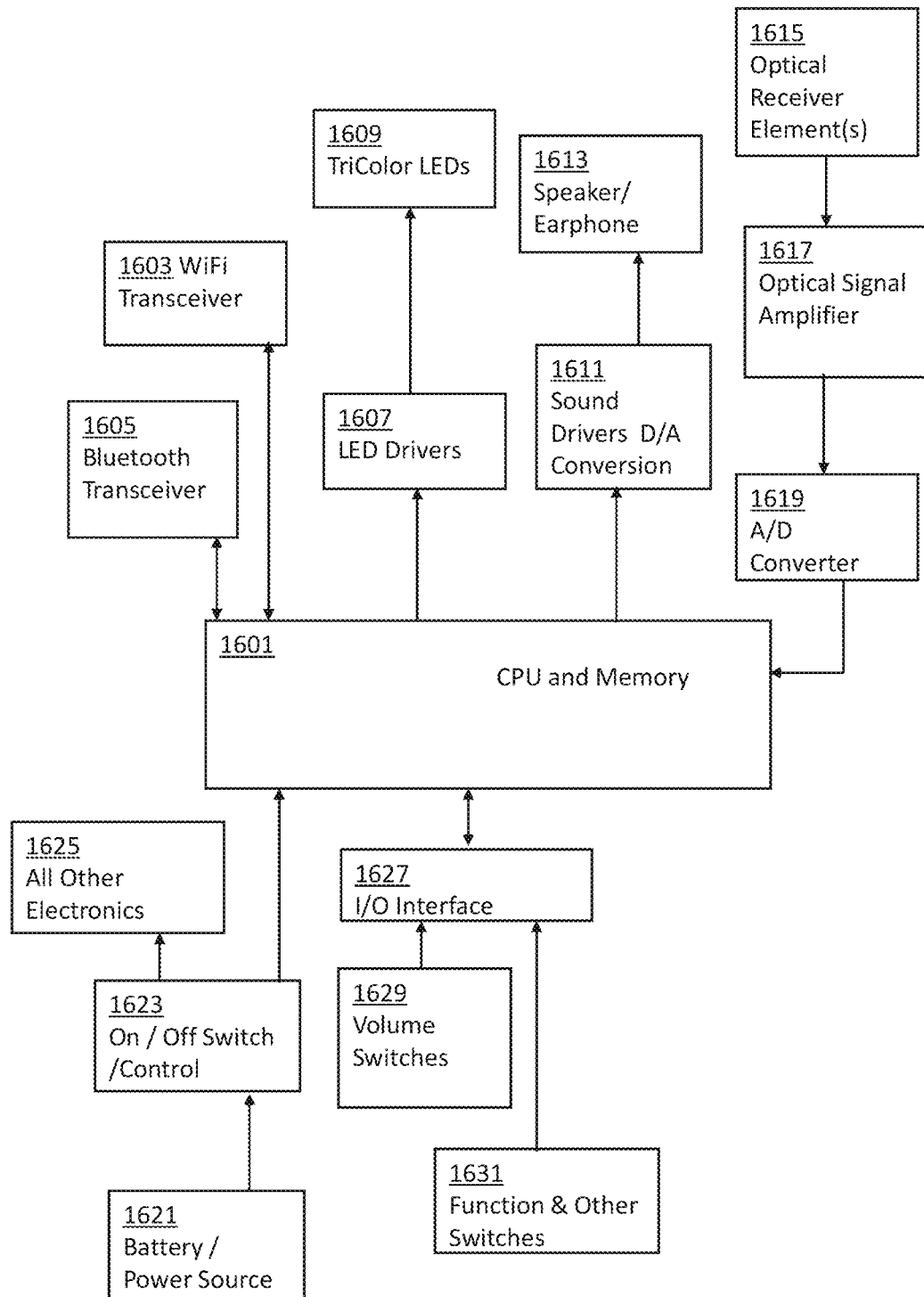
FIG. 16 shows a typical block diagram of a receiver module in accordance with an embodiment of the present technology.

FIG. 16 shows a simplified block diagram of the receiver of FIG. 15 according to an embodiment. A device 1601 that combines a central processing unit (CPU) and a memory device is central to the operation of the receiver 150, and controls the other functions of the embodiment, except for a power on/off circuitry 1623, which is manually accessed by the user via the ON/OFF switch 1519. The device 1601 is operatively connected, directly or indirectly, to tricolor LEDs 1609, to a WiFi receiver 1603, to a Bluetooth receiver 1605, to LED drivers 1607, to a speaker and/or an earphone 1613, to sound drivers with digital to analog (D/A) conversion 1611, to one or more optical receiver element 1615, to an optical signal amplifier 1617, to an analog to digital (A/D) converter 1619, to other electronic devices 1625, to a battery and/or other power source 1621, to volume switches 1629, to an input/output (I/O) interface 1627, and to other function switches 1631. Various embodiments of the receiver may comprise all or various subsets of this list of components.

Figure 17B:
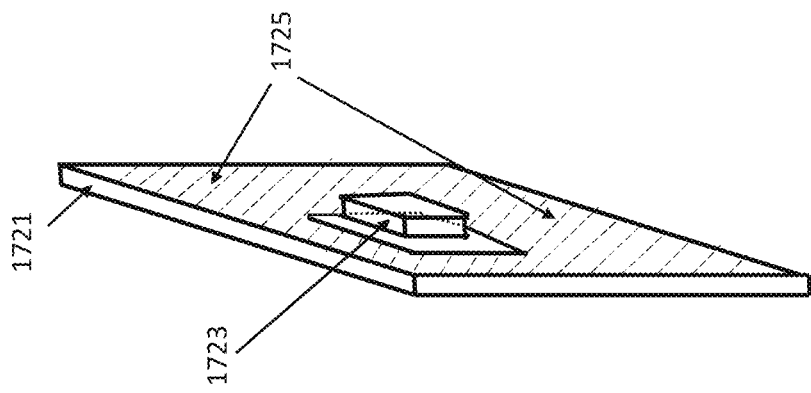
FIGS. 17A and 17B show two variants of a reflector plate design for a pixel shaper in accordance with an embodiment of the present technology.
Figure 17A:
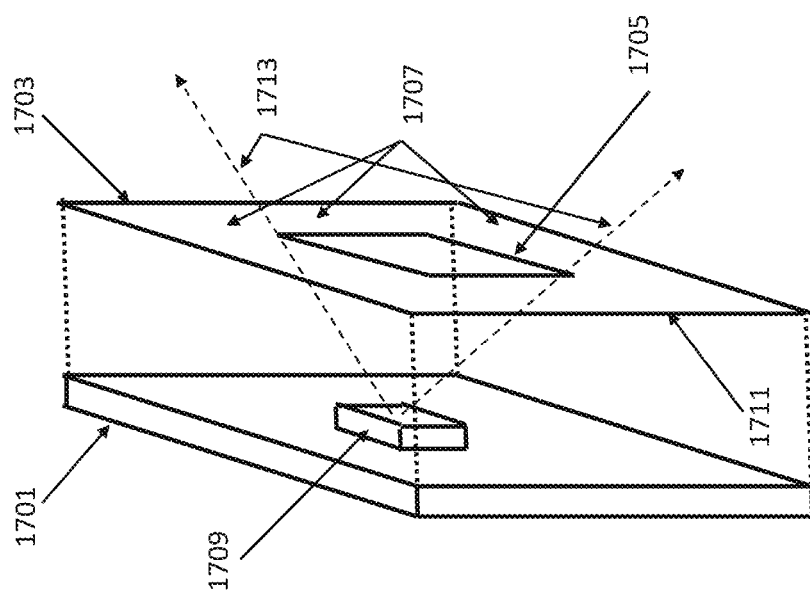

FIGS. 17A and 17B show two variants of a reflector plate design for a pixel shaper. FIGS. 17A and 17B shows the detail of two methods of providing reflection from the back of a shaper unit. On FIG. 17A, a reflector plate 1703 (only a small section is shown on FIG. 17A), which has a non-reflective back 1711, is the reflector plate 1202 (FIG. 12). A LED 1709 is mounted on a PCB 1701 (only a small section of the PCB 1701 is shown on FIG. 17A). A cut-out 1705 in the reflector plate 1703 is larger than a radiation surface of the LED 1709 in order to allow most of the light 1713 emitted by the LED 1709 to pass through unobstructed and to spread at a fairly wide angle. Light reflecting backwards from the textured walls 1205 of the shaper element 1203 (FIG. 12), would reflect once more off reflective areas 1707 of the reflector plate 1703, and be sent forwards towards the projector lens (not shown on FIG. 17A). The shown section of the reflector plate 1703 is for the radiation surface of one LED 1709. For the entire matrix of LEDs 1709, there is a large reflector plate 1703 with dedicated cut-outs 1705 for each corresponding LED 1709. FIG. 17B shows an alternative to the reflector sheet of FIG. 17A. Textured reflective paint 1725 is applied to the areas of a PCB 1721 (only a small section is shown), around each LED 1723. This has the effect of providing reflection at the back of the shaper assembly, without requiring a reflector plate. It should be noted that this technique might cause some optical noise, as some of the energy of the reflections off the paint could cross over to the adjacent shaper element 1203. The choice using the configuration of FIG. 17A or 17B may depend upon the specification requirement for any specific application.

Figure 18:
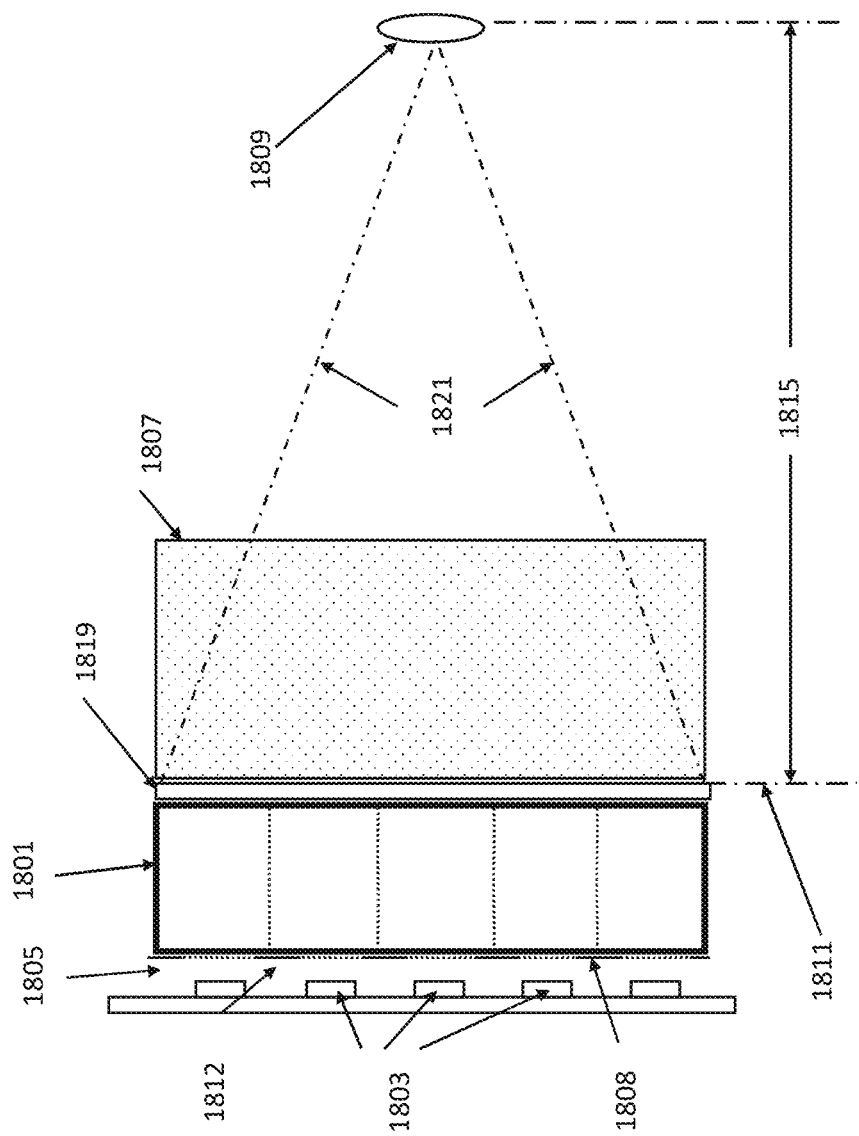
FIG. 18 shows a pixel shaper combined with a Fresnel lens in accordance with an embodiment of the present technology.

FIG. 18 shows an embodiment using a pixel shaper assembly combined with a Fresnel lens. This embodiment combines some of the features of FIGS. 13 and 14. The performance of a pixel shaper assembly 1801, which forms substantially ideal rectangular pixel shapes, is improved by the addition of a Fresnel lens 1819, which provides a brighter, more powerful signal by the concentration of shaped beams that converge towards a projector lens 1809. It may be noted that a focusing plane 1811, at a focusing distance 1815 of the projector lens 1809, is moved to the front of the Fresnel lens 1819. The Fresnel lens 1819 is positioned directly in front of the 2D pixel array and has the correct optical power useful to concentrate the optical signal outputs of the pixel shaper assembly 1801, these optical signal outputs being directed toward the projector lens 1809

As in the case of FIG. 13, FIG. 18 shows an air gap 1805 for cooling of LEDS 1803 mounted on a PCB 1812 and a light absorbing hood 1807 positioned between the PCB 1812 and the projector lens 1309. An optional reflector plate 1808 may be mounted on the pixel shaper assembly 1801.

Figure 19:
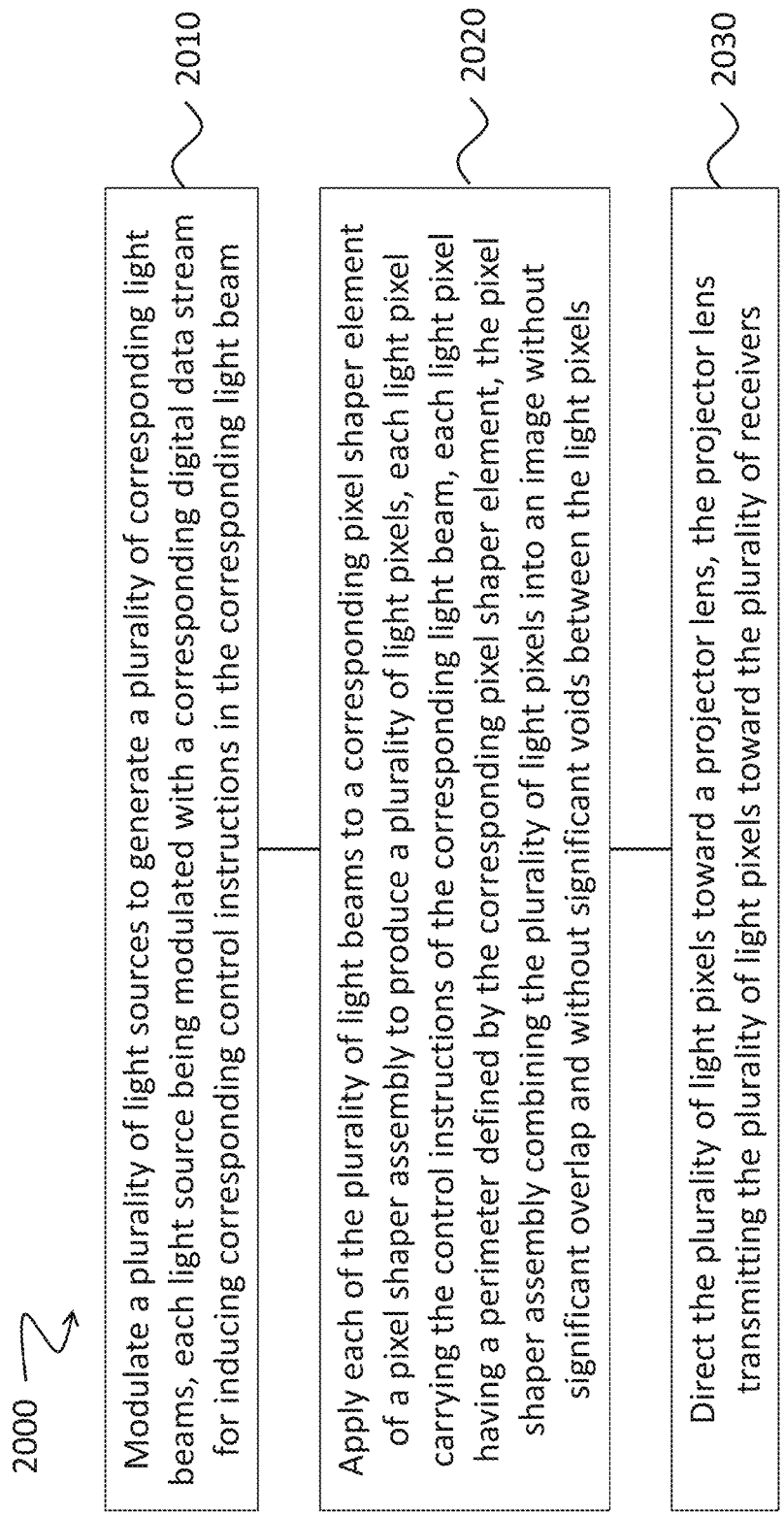
FIG. 19 is a sequence diagram showing operations of a method for transmitting control instructions to a plurality of receivers in accordance with an embodiment of the present technology.

FIG. 19 is a sequence diagram showing operations of a method for transmitting control instructions to a plurality of receivers 1501. On FIG. 19, a sequence 2000 comprises a plurality of operations, some of which may be performed in a different order, some of which may be optional. At operation 2010 a plurality of light sources, for example the LEDs 1201 or 1303, are modulated to generate a plurality of corresponding light beams, each light source being modulated with a corresponding digital data stream for inducing corresponding control instructions in the corresponding light beam. Each of the plurality of light beams is applied to a corresponding pixel shaper element (e.g. 1203) of the pixel shaper assembly 1101 or 1301 at operation 2020 to produce a plurality of light pixels (e.g. 94), each light pixel carrying the control instructions of the corresponding light beam, each light pixel having a perimeter defined by the corresponding pixel shaper element 1203, the pixel shaper assembly combining the plurality of light pixels into an image without significant overlap and without significant voids between the light pixels. At operation 2030, the light pixels are directed toward a projector lens (e.g. 1109, 1211), the projector lens transmitting the plurality of light pixels toward the plurality of receivers 1501.

While the above-described implementations have been described and shown with reference to particular operations performed in a particular order, it will be understood that at least some of these operations may be combined, subdivided, or re-ordered without departing from the teachings of the present technology. At least some of the operations may be executed in parallel or in series. Accordingly, the disclosed order and grouping of the operations is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for transmitting control instructions to a plurality of receivers, the method comprising:

modulating a plurality of light sources to generate a plurality of corresponding light beams, each light source being modulated with a corresponding digital data stream for inducing corresponding control instructions in the corresponding light beam, each light source being operable to emit visible light and infrared light;

applying each of the plurality of light beams to a corresponding pixel shaper element of a pixel shaper assembly to produce a plurality of light pixels, each light pixel carrying the control instructions of the corresponding light beam, each light pixel having a perimeter defined by the corresponding pixel shaper element, the pixel shaper assembly combining the plurality of light pixels into an image without significant overlap and without significant voids between the light pixels, the plurality of light pixels being directed toward a projector lens, the projector lens transmitting the plurality of light pixels toward the plurality of receivers; and causing the plurality of light sources to emit a plurality of visible light pixels to allow previewing a visible image formed combining the plurality of visible light pixels.

2. The method of claim 1, wherein:
the light sources form a first two-dimensional (2D) array;
the plurality of light beams form a second 2D array; and
the plurality of image pixels form a third 2D array.

3. The method of claim 2, wherein each of the first, second and third 2D arrays forms a respective rectangular matrix.

4. The method of claim 1, wherein each light source is a light emitting diode (LED).

5. The method of claim 1, wherein each light pixel is directed toward one or more receivers.

6. The method of claim 5, wherein at least one of the one or more receivers is a movable receiver adapted to move between reception areas of distinct light pixels.

7. The method of claim 6, wherein at the least one of the one or more receivers is operable to interpret positional information received in the distinct light pixels.

8. The method of claim 5, wherein at least one of the one or more receivers includes a user operable switch configured to allow selection of one of a plurality of supported functions.

9. The method of claim 5, wherein the control instructions transmitted in each light pixel are configured to control, in each of the one or more receivers, a function selected from operating a lighting element, operating a sound element, operating a Bluetooth communication unit, operating a WiFi communication unit, and a combination thereof.

10. A receiver adapted to receive a light pixel carrying control instructions transmitted using the method of claim 1, the receiver comprising:
a power source;
an optical receiver receiving power from the power source and being adapted to detect the light pixel; and
a controller receiving power from the power source and being operatively connected to the optical receiver, the controller being configured to:
decode the control instructions received in the detected light pixel, and
use the control instructions to control a function of the receiver.

11. The receiver of claim 10, wherein the power source comprises a battery.

12. The receiver of claim 10, wherein the function of the receiver comprises operating a sound element, the sound element comprising a speaker.

13. The receiver of claim 10, wherein the function of the receiver comprises operating a sound element, the sound element comprising an electrical jack output.

14. The receiver of claim 10, wherein the receiver is fitted with one or more attachments to allow attaching the receiver to a body part or to a piece of clothing of a wearer.

15. The receiver of claim 10, wherein the controller comprises a processor and a non-transitory storage medium containing instructions that, when executed by the processor, allow the controller to interpret and use the control instructions.

16. The receiver of claim 10, further comprising at least one user controllable switch or button allowing a user to select one of a range of functions related to the control instructions.

17. The receiver of claim 10, wherein the function of the receiver is selected from operating a lighting element, operating a sound element, operating a Bluetooth communication unit, operating a WiFi communication unit, and a combination thereof.

18. A method for transmitting control instructions to a plurality of receivers, the method comprising:
modulating a plurality of infrared light sources to generate a plurality of corresponding light beams, each infrared light source being modulated with a corresponding digital data stream for inducing corresponding control instructions in the corresponding light beam;
applying each of the plurality of light beams to a corresponding pixel shaper element of a pixel shaper assembly to produce a plurality of light pixels, each light pixel carrying the control instructions of the corresponding light beam, each light pixel having a perimeter defined by the corresponding pixel shaper element, the pixel shaper assembly combining the plurality of light pixels into an image without significant overlap and without significant voids between the light pixels, the plurality of light pixels being directed toward a projector lens, the projector lens transmitting the plurality of light pixels toward the plurality of receivers;
replacing each of the plurality of infrared light sources with a temporary light source operable to emit visible light;
causing the temporary light sources to emit a plurality of visible light pixels to allow previewing a visible image formed combining the plurality of visible light pixels; and
after the previewing the visible image, restoring the plurality of infrared light sources.

* * * * *